United States Patent
Hibbs

(10) Patent No.: US 11,441,108 B2
(45) Date of Patent: Sep. 13, 2022

(54) TOILET WASTE MATERIAL TREATMENT PACKAGED FORMULATION AND METHOD

(71) Applicant: Coversan LLC, Savannah, MO (US)

(72) Inventor: Curtis Randall Hibbs, Savannah, MO (US)

(73) Assignee: Coversan, LLC, Savannah, MO (US)

( * ) Notice: Subject to any disclaimer, the term of this patent is extended or adjusted under 35 U.S.C. 154(b) by 0 days.

(21) Appl. No.: 16/948,249

(22) Filed: Sep. 10, 2020

(65) Prior Publication Data

US 2021/0131087 A1  May 6, 2021

Related U.S. Application Data

(60) Provisional application No. 62/928,161, filed on Oct. 30, 2019.

(51) Int. Cl.

| | |
|---|---|
| C11D 17/04 | (2006.01) |
| C11D 3/12 | (2006.01) |
| C11D 3/22 | (2006.01) |
| C11D 3/39 | (2006.01) |
| C11D 17/06 | (2006.01) |
| C02F 1/68 | (2006.01) |
| E03D 11/11 | (2006.01) |
| C02F 103/00 | (2006.01) |

(52) U.S. Cl.
CPC ............ *C11D 17/045* (2013.01); *C02F 1/688* (2013.01); *C11D 3/3942* (2013.01); *C11D 17/06* (2013.01); *C02F 2103/005* (2013.01); *E03D 11/11* (2013.01)

(58) Field of Classification Search
None
See application file for complete search history.

(56) References Cited

U.S. PATENT DOCUMENTS

| | | | |
|---|---|---|---|
| 3,219,575 A | | 11/1965 | Chapman et al. |
| 4,215,990 A | * | 8/1980 | Barrett, Jr. ............ C11D 3/3942 510/315 |
| 4,615,810 A | | 10/1986 | Conner |
| 5,482,528 A | | 1/1996 | Angell et al. |
| 5,656,584 A | * | 8/1997 | Angell ................... C11D 3/222 510/474 |
| 5,972,858 A | * | 10/1999 | Roche ..................... C11D 17/08 510/159 |
| 6,197,081 B1 | | 3/2001 | Schmidt |
| 7,291,276 B1 | * | 11/2007 | Zahn ......................... C02F 1/50 210/759 |
| 9,743,815 B2 | | 8/2017 | Hibbs |
| 10,264,932 B2 | | 4/2019 | Hibbs |
| 2004/0002433 A1 | * | 1/2004 | Buckland ................ A01N 59/02 510/375 |
| 2006/0071057 A1 | | 4/2006 | Aschenbrenner et al. |
| 2006/0211593 A1 | * | 9/2006 | Smith ..................... C11D 1/831 510/424 |
| 2007/0164021 A1 | | 7/2007 | Nobel |
| 2010/0086239 A1 | | 4/2010 | Latour |
| 2011/0113960 A1 | | 5/2011 | Agblevor et al. |
| 2012/0255901 A1 | * | 10/2012 | Thorgersen ............... C12N 1/20 210/615 |
| 2015/0136637 A1 | * | 5/2015 | Meier ..................... B65D 75/54 53/415 |
| 2016/0102279 A1 | * | 4/2016 | Labeque ............... C11D 17/042 510/513 |
| 2017/0253403 A1 | | 9/2017 | Evans et al. |

FOREIGN PATENT DOCUMENTS

| | | |
|---|---|---|
| EP | 0338060 B1 | 6/1991 |
| WO | 2010091246 A3 | 9/2010 |

OTHER PUBLICATIONS

Cabin Obsession, Cabin Obsession RV Toilet Treatment Drop Ins, Sewer Chemicals and Cleaners, Jan. 18, 2019, 7 pages, Amazon, United States.

Joseph Davidovits, Method for stabilizing, solidifying and storing waste material, this is a machine translation of a foreign patent originally published on Oct. 25, 1989, European Patent Office, France.

Nakano, Masayoshi; Wada, Takeshi; Koga, Nobuyoshi; Exothermic Behavior of Thermal Decomposition of SodiumPercarbonate: Kinetic Deconvolution of Successive Endothermic and Exothermic Processes, The Journal of Physical Chemistry, published Sep. 7, 2015, American Chemical Society.

\* cited by examiner

*Primary Examiner* — Lorna M Douyon
(74) *Attorney, Agent, or Firm* — Daniel J. Coughlin; Stuart M. Aller; Coughlin Law Office LLC

(57) ABSTRACT

A reactive toilet treatment packaged formulation and method for treatment of waste material resulting in a more stable, entombed treated waste product. The reactive toilet treatment comprises a foamable surfactant that is granular and sodium percarbonate. A multi-part formulation can be delivered in a multi-compartment vessel that cooperates with a self-contained non-contact agitating toilet. The reactive treatment formulation prevents odors, bacterial growth, and stabilizes waste to reduce spillage during disposal.

28 Claims, 17 Drawing Sheets

Front Plan View of Vessel for Holding the Formulation

Side Plan View of Vessel Opener for Disbursement of the Formulation

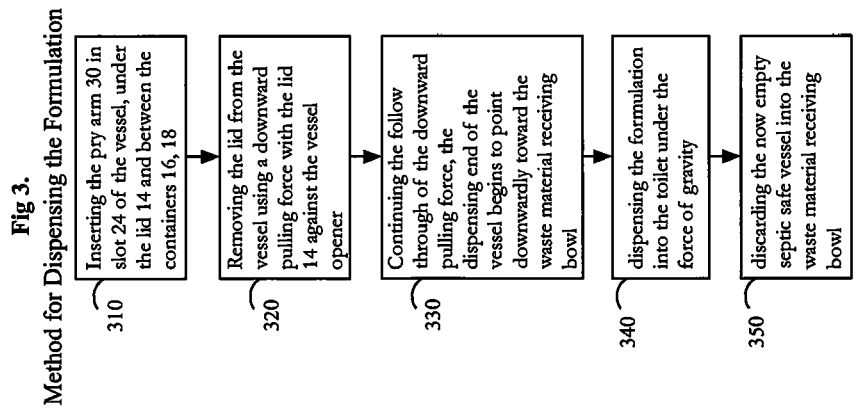

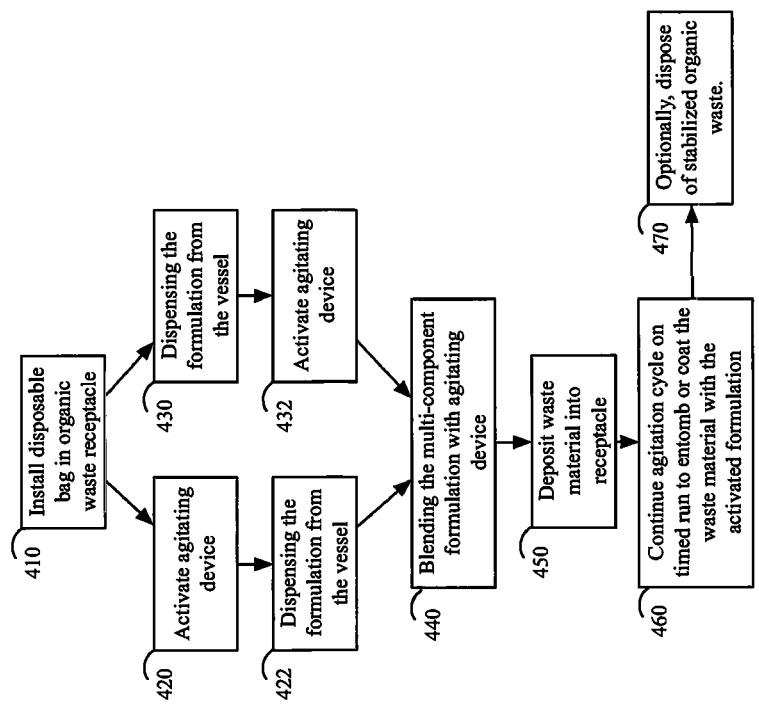

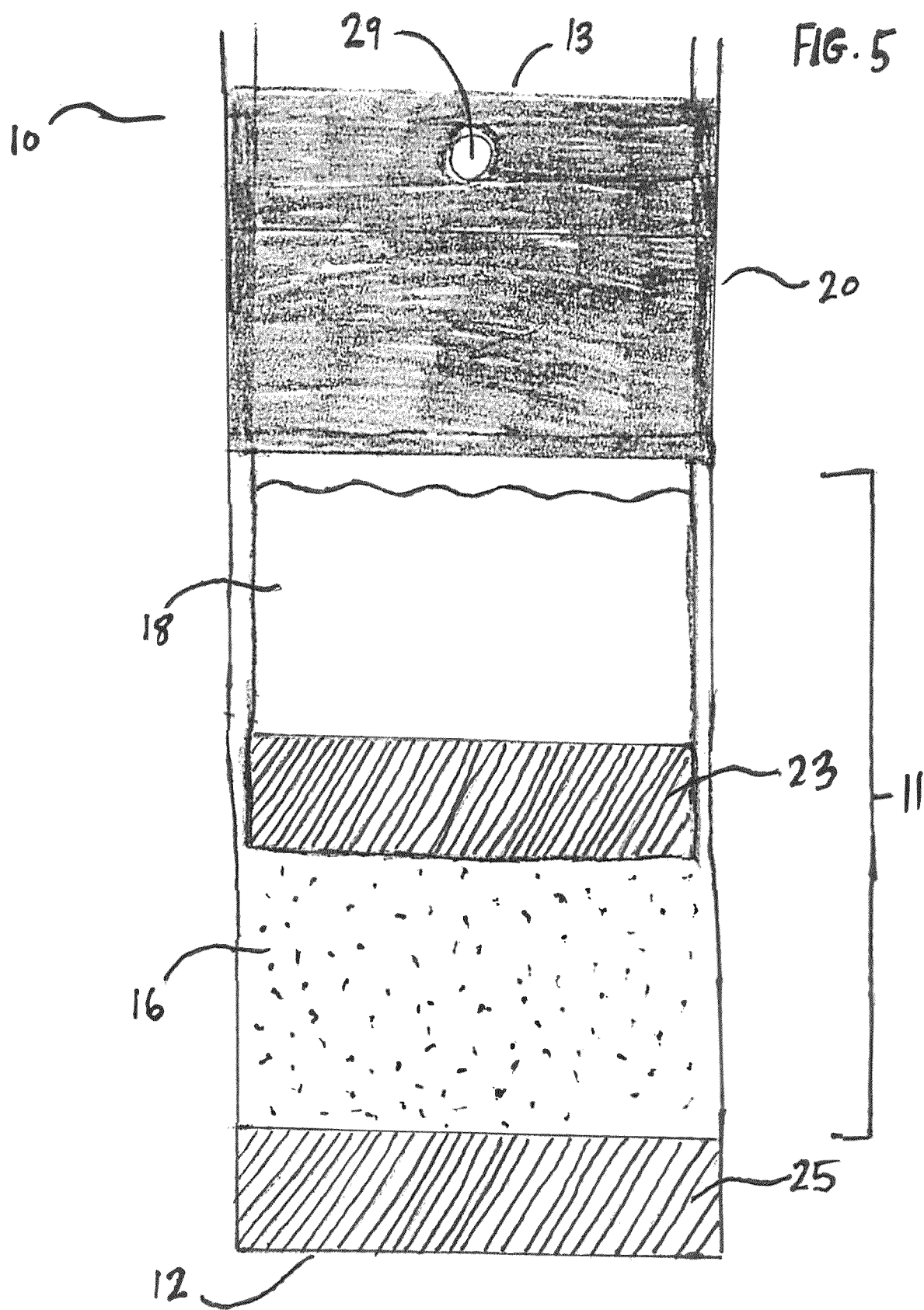

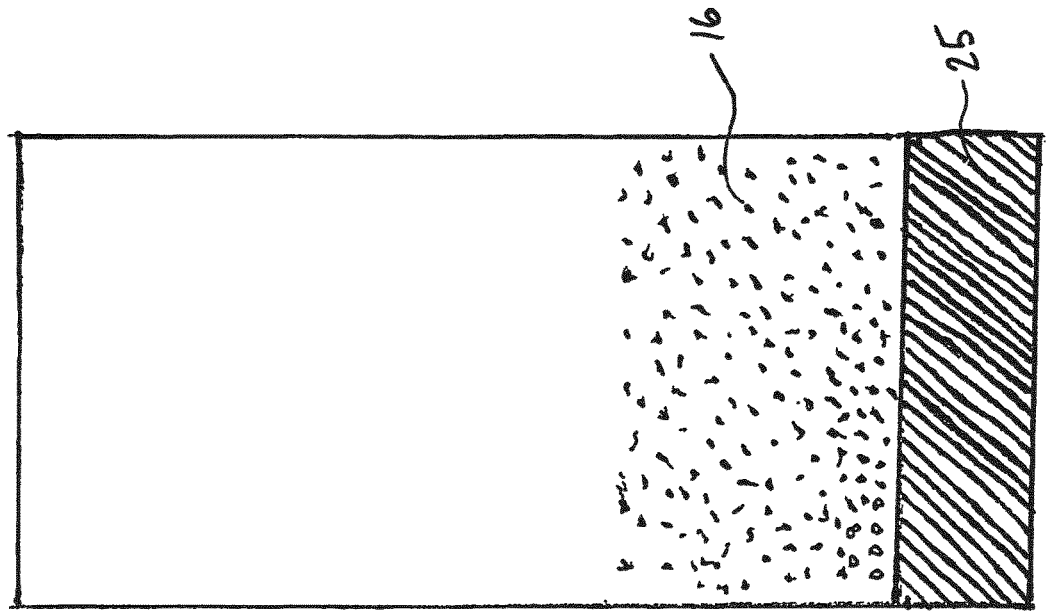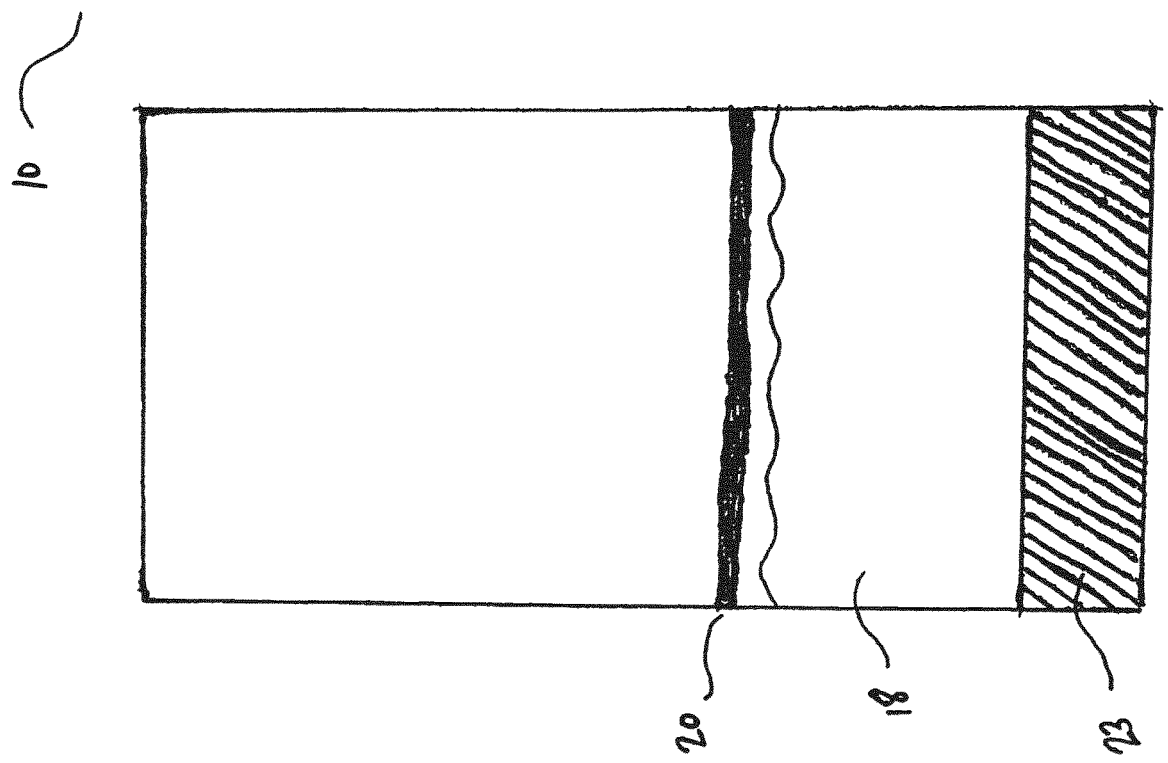

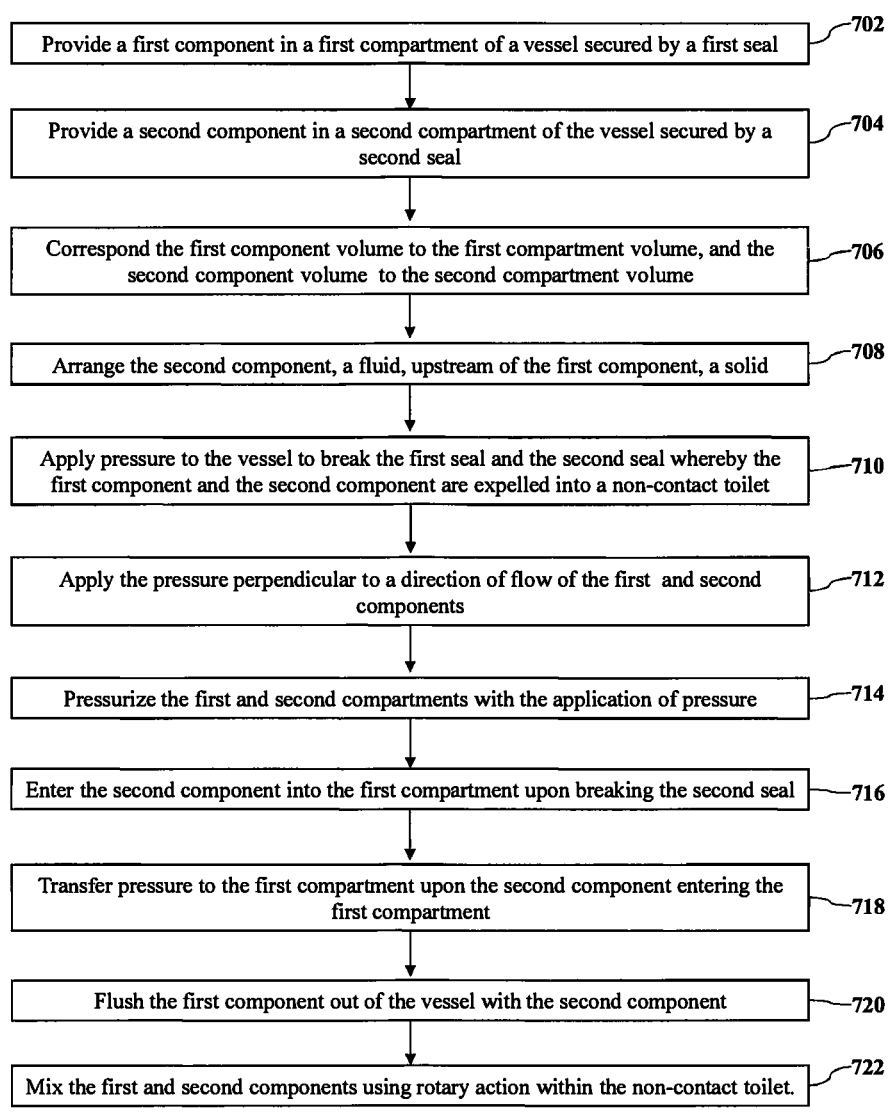

TOILET WASTE MATERIAL TREATMENT PACKAGED FORMULATION AND METHOD

BACKGROUND

Human waste in toilet systems undergoes very minimal to no treatment prior to disposal in a septic system or sewage treatment plant. A conventional water-based toilet, typically connected to a pressurized water line, transfers waste from the water toilet to a wastewater line by water movement. A portable toilet closet, such as is commonly found at public outdoor events or construction sites, utilizes a fluid chemical blend to treat waste deposits to ensure user and public safety. A more personal use composting toilet, such as are used in residences without plumbing, requires the manufacturer of the toilet to instruct the owner how to install and operate their toilet system. An important instruction is to properly vent a composting toilet outside to minimize airborne particulate and odors inside the dwelling. The maker of the composting toilet may also instruct the owner of a recommended dry media that works best in their toilet for stabilizing the waste. Each of these toilet systems require special handling techniques by trained installers to ensure the safe transport of waste to a sanitary location or decomposition of waste for the toilet's continued use.

The aforementioned waste material systems use media suffering from one or more of the following disadvantages. Water, as in the flush toilet example, depends upon the installer and the fresh water treatment facility to supply water for its function. This requires the use of relatively large amounts of water, which has been recognized as a valuable commodity, particularly in locations where water is a scarce resource. Chemicals, as used in portable toilet closets, use less water than their flush toilet counterparts but require the use of chemicals that may hinder the efficient decomposition of the waste. Disinfectant and/or deodorant chemical solutions also result in an accumulation of odorous and unpleasant sludge which must eventually be handled, dewatered, or stabilized to be transported and finally disposed. Composting, as used by many public parks for example, may use one or more types of microbes to decompose the waste in place. Yet the composting process provided by these microbes can often generate mold, fungus, bacteria and unpleasant odors that may require additional mechanisms, such as ventilation systems, thus limiting the locations where these composting toilets may be used. Dry absorptive media, such as dirt or sawdust, can become airborne and contaminate the user due to the buildup of static electric charges and kinetic energy. Use of dry media in a water toilet, if wetted, can foul plumbing or sewage treatment systems, limit toilet function or media effectiveness, and block waste transport.

SUMMARY

I disclose a two-part formulation for treatment of waste material, such as human waste excrement, that also satisfies the needs for acceptable transport and disposal of the waste material. The two-part formulation also reduces foul odors produced by the waste material. The first part of the formulation comprises a soap that is granular. The second part comprises an oxidizing agent, such as sodium percarbonate. The two parts are stored separately in order to prevent completion of the reaction of the materials before the introduction of the waste material.

I also disclose an associated method for dispensing a two-part formulation into a toilet apparatus without complicated mixing or measuring steps. A biodegradable two-compartment vessel comprises a first container for storing a measured quantity of the first formulation and a second container for storing a measured quantity of the second formulation. A lid is mounted over the first container and the second container, wherein removal of a single lid exposes the contents of both the first container and the second container.

In addition, I developed a method for simultaneously opening the two-compartment vessel and dispensing the formulation in one action. The lid cooperates with a vessel opener mounted to the toilet apparatus. The vessel opener is mounted within the toilet apparatus such that the lid falls under the force of gravity into the waste material receiving bowl. The continued movement in the direction of the lid removal action inverts the vessel, such that the contents of the first container and second container are dispensed under the force of gravity into the waste material receiving bowl.

I also developed a method for converting waste material into a stable mass having desirable characteristics. The two-part formulation is dispensed into the waste material receiving bowl. The waste material is also deposited into the waste material receiving bowl. The waste material and two-part formulation are agitated to comingle the first formulation, the second formulation, and the waste material. The reaction of the first formulation, the second formulation, and the waste material forms a stable mass without unpleasant odors and not subject to mold and bacterial growth.

My present disclosure is suitable for use in health care, transportation, and recreational applications such as trucking, boats, recreational vehicles, camping and primitive cabins, as well as for other varied or multi-uses that may encounter the need for simple yet effective disposal of waste material. Some advantages of the waste treatment formulation may include:

a) inexpensive and limited volume compared to the volume of waste material;
b) limits potentially harmful dust capable of becoming airborne during use or if disturbed after prolonged abandonment;
c) safer to handle and dispense by the user compared to untreated sewage;
d) near instantaneous odor reduction from waste material;
e) rapid liquid absorption that reduces spill risk during transportation;
f) results in a treated waste composition not conducive for mold or bacterial production by optional incorporation of anti-fungal and anti-bacterial agents of sufficient quantities;
g) accepts additional applications of formulation and waste material while using the same disposal bag; and
h) results in a treated waste composition mass not harmful to septic systems.

For the foregoing reasons, there is a need for the present disclosure of a novel waste material treatment formulation that is safe to handle and inexpensively manufactured. There is also a need for a multi-compartment vessel that easily holds and dispenses the formulation while being manufactured from inexpensive, biodegradable materials so that it may be discarded along with the waste material. There is also a need for a process for converting waste material into a stable mass easily handled and transported for final disposal. My formulation solves the foregoing problems by providing an advantageous solution over the prior art for treating waste material.

BRIEF DESCRIPTION OF THE DRAWINGS

These and other features, aspects, and advantages of the present disclosure will become better understood with regard to the following description, appended claims, and accompanying drawings where:

FIG. 3 shows a flowchart for dispensing the formulation;

FIG. 4 shows a flowchart for waste material treatment within a toilet;

FIG. 5 shows a front view of a waste treatment package having a second compartment disposed within a first compartment for delivering the formulation through burstable seals;

FIG. 6 shows front views of a second compartment separated from a first compartment;

FIG. 7 shows a flowchart for bursting the burstable seals by applying pressure to the waste treatment package;

DESCRIPTION

Figure 1:
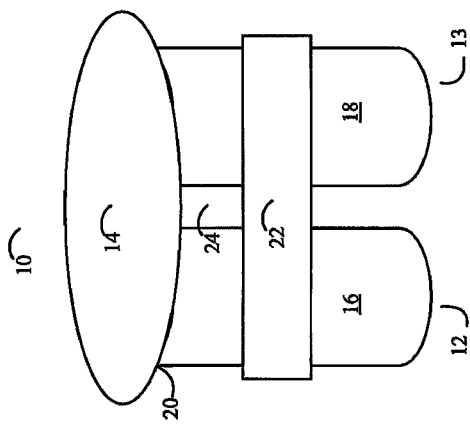
FIG. 1 shows a front view of a two-compartment waste treatment package for delivering the formulation.

Waste material can be treated using a formulation for use in a toilet, specifically for use in a self-contained agitating toilet as described in U.S. Pat. No. 9,743,815, issued based on U.S. patent application Ser. No. 14/815,181 filed on Jul. 31, 2015, the specification and drawings of which are incorporated herein by reference.

The formulation for treatment of waste material, in one embodiment, comprises a first component that is dry. The first component is combined with a solvent such as water and waste material to initiate a waste treatment reaction. The first component comprises a soap that is granular. Generally, soap is the product of saponification, which is the process of making the soap by the hydrolysis of glyceride esters of fatty acids to glycerol and sodium salts of the acids present.

The composition of soap may change due to the selection of fatty acids. The fatty acids used to make the soap may be a combination of one or more oils selected from the following: acai butter, almond oil, aloe vera, apricot kernel oil, avocado oil, babassu palm oil, beeswax, black cumin, blackcurrant oil, baobab seed oil, borage oil, borage oil, borneo tallow nut oil, brazil nut oil, butterfat, cameline oil, candlenut oil, canola oil, carnauba wax, cashew nut oil, castor oil, cherry kernel oil, cocoa butter, coconut oil, cod liver oil, coffee bean oil (roasted or raw), cohune nut oil, corn oil, cottonseed oil, cranberry seed, dhupa (malabar) fat, domba (tamanu) fat, emu oil, evening primrose oil, filbert (hazelnut) oil, ghee butter, goose fat, grapeseed oil, grapefruit seed oil, hempseed oil, horse fat, illipe butter, jojoba oil (refined or unrefined), kanya tallow, karanja (pengam) oil, kokum butter, lanolin, lard, flaxseed oil, linseed oil, mango butter, mango seed oil, meadowfoam seed oil, mink, Monoi de Tahiti, mowrah butter, mutton, neem oil, neat's-foot oil, niger seed oil, olive oil, palm kernel oil, palm oil, palm olein, palm stearin, papaya seed oil, peach kernel oil, peanut oil, pecan nut oil, perilla oil, pine nut oil, pistachio nut oil, plum kernal oil, poppyseed oil, pumpkin seed oil, rapeseed oil, rice bran oil, safflower oil, sal (shorea) fat, sesame seed oil, shea nut butter, soybean oil, sunflower seed oil, tall oil, tallow, tea seed oil, walnut oil, and wheat germ oil. In one embodiment, the fatty acids used to make the soap are a combination of 100 parts of distiller's corn oil and between 3 parts to 15 parts of coconut-derived oil. The fatty acids may also comprise butters and greases.

The composition of the soap also depends on the lye used for hydrolysis. The lye used may be sodium hydroxide or potassium hydroxide. Alternative examples to lye are calcium hydroxide, magnesium hydroxide or other suitable alkalis. Sodium hydroxide may be preferable due to its effectiveness in making a solid soap that can be easily granulated. As used herein, granulated soap means a solid soap that has been subjected to processing through the actions of cutting, slicing, chopping, shredding, crushing, grinding, grating, pulverizing and the like. Granulating the soap may be beneficial due to the increased surface area of the soap granules. In one embodiment, the soap comprises at least 45% of a total volume of the dry formulation. In another embodiment, the soap comprises at most 90% of a total volume of the dry formulation. In another embodiment, the soap comprises between 35%, 40%, 45%, or 50% to 75%, 80%, 85%, 90%, or 98% of the total volume of the dry formulation. In one embodiment, the first component comprises between 35% to 98% soap. In a more preferred embodiment, the first component comprises between 40% to 90% soap. In a still more preferred embodiment, the first component comprises 90% soap. In another embodiment, the first component comprises at least 8 grams of granulated soap in 50 cubic centimeters ($cm^3$) of first component. In a preferred embodiment, the first component comprises between 5 grams and 45 grams of granulated soap in 50 $cm^3$ of first component. In a more preferred embodiment, the first component comprises between 10 grams and 35 grams of granulated soap in 50 $cm^3$ of first component.

The first component of the formulation may also comprise an oxidizing agent. The oxidizing agents may be sodium percarbonate, sodium peroxide, calcium peroxide, or other suitable oxidizers. Sodium percarbonate may be advantageous due to being inexpensive and having a long shelf life compared with hydrogen peroxide. Sodium percarbonate is an oxidizing agent commonly known as solid hydrogen peroxide having the chemical formula of 2 $Na_2CO_3 \cdot 3\ H_2O_2$. Sodium percarbonate is commercially available from a manufacturer or other supplier. The oxidizing agent comprises at least 5% of the total volume of the formulation. In another embodiment, the oxidizing agent comprises at most 20% of the total volume of the formulation. In another embodiment, the first component comprises at least 2 grams of sodium percarbonate in 50 cm$^3$ of first component. In a preferred embodiment, the first component comprises between 1 gram and 10 grams of sodium percarbonate in 50 cm$^3$ of first component. In a more preferred embodiment, the first component comprises 5 g of sodium percarbonate in 50 cm$^3$ of first component.

In another embodiment, a second component of the formulation may comprise an alkali substance, such as sodium carbonate. A sodium carbonate substance may be in the form of soda ash. Soda ash is anhydrous sodium carbonate, having the formula $Na_2CO_3$. Alternatively, the sodium carbonate substance may be in the form of a hydrate, such as the monohydrate $Na_2CO_3.H_2O$ or the decahydrate $Na_2CO_3.10\ H_2O$, which is also known as washing soda. Alternatively, the sodium carbonate substance may comprise sodium sesquicarbonate, $Na_2CO_3.NaHCO_3.2\ H_2O$. Sodium sesquicarbonate is soluble in water and less alkaline than anhydrous sodium carbonate. Alternatively, the calcium carbonate substance may comprise a natural deposit containing $Na_2CO_3$, such as trona ($Na_2CO_3.NaHCO_3.2\ H_2O$), natron ($Na_2CO_3.10\ H_2O$), ranksite ($2\ Na_2CO_3.9\ Na_2SO_4.KCl$), pirsonnite ($Na_2CO_3.CaCO_3.2\ H_2O$), and gaylussite ($Na_2CO_3.CaCO_3.5\ H_2O$). In one embodiment, the soap and oxidizing agent, if any, such as sodium percarbonate, and alkali substance, if any, such as a sodium carbonate substance, is in a solid granulated form such as fine grains or powder. The reference to the first component being dry does not preclude the first component from comprising hydrates of one or more substances in the first component. In one embodiment, the total volume of the dry formulation is 50 ml. In another embodiment, the total volume of the dry formulation is between 40 ml and 90 ml, 45 ml and 65 ml, or 40 ml to 160 ml.

In addition to the first component, the formulation may comprise a second component that is liquid. The liquid component may be pH adjusted to give a final liquid component pH of between 8.0 to 10.0. Alternatively, the liquid component may have a pH between 3.0 to 6.0, or 3.0 to 11.0, or 6.0 to 8.0. For example, one or more bases may be added to the liquid component such as sodium hydroxide, potassium hydroxide, sodium carbonate, sodium bicarbonate, calcium hydroxide, or other commercially available bases. The second component comprises a solvent that will dissolve and activate the first component of the formulation. Examples of solvents are water, milk, urine, acetic acid, or other suitable polar solvent. Water is easily obtained and safely handled. Water, having the chemical formula of $H_2O$, is also a good polar solvent. Water can be provided as a co-packaged additive as described below or the second component can be sourced at or near the toilet. For example, the second component can be obtained from a municipality, naturally available, or other supplier. The second component may comprise a liquid volume equal to the volume of the dry formulation in order to form a solid, stable treated waste product. Alternatively, the second component may comprise a liquid volume greater than the volume of the dry formulation in order to generate a flowable treated waste product. The formulation is activated when the solvent dissolves the soap into a more liquid form. Using sodium percarbonate, addition of the liquid causes the sodium percarbonate to dissociate into hydrogen peroxide and soda ash. The hydrogen peroxide eventually decomposes to water and oxygen. Hydrogen peroxide is commonly used as an oxidizer, bleaching agent and antiseptic. The hydrogen peroxide may react with the enzymes and other warm biological matter found in the waste material. Additionally, the soda ash may react with the waste material to prevent or neutralize odors. Urine is generally slightly acidic, ranging in pH from 4.5 to 8.0, with an average value of 6.0. Slightly acidic urine may react with the sodium percarbonate, releasing carbon dioxide. Otherwise, sodium percarbonate breaks down into oxygen, water, and soda ash (sodium carbonate, $Na_2CO_3$). The soda ash may assist in the neutralization of odor causing chemicals (indole, skatole, hydrogen sulfide, and mercaptans) associated with the waste material. In one embodiment, soda ash is added as a component to be reacted with the waste material in the presence of the soap.

The formulation may comprise an effective quantity of one or more additives such as a detergent, an acid (such as citric acid or acetic acid), an antimicrobial, a disinfectant, an antiseptic, a foam stabilizer, a filler, a binding agent, a tackifier, an emulsifier, a surfactant, an alcohol, a fragrance bactericide, a malodor treatment, a base or an enzymatic solution that safely digests waste material or any combination thereof. Each of these additives may be added at an acceptable level based on industry standards. The disinfectant may comprise an anti-microbial in an effective quantity to kill or prohibit the growth of bacteria and fungus in the treated waste product. The alcohol may comprise propylene glycol. Propylene glycol may provide polymerization during waste stabilization in the toilet bag and may prevent freezing of the liquid component.

The second component may comprise 35% hydrogen peroxide. In one embodiment, the formulation may contain a combination of additives that act as a sanitizer, with a sufficient amount of antimicrobial agents, bactericidal compounds, or other disinfecting compounds that prevent or inhibit the proliferation of bacteria, viruses, yeasts, fungi, and other harmful pathogens to allow for the safe transportation and disposal of any waste material product. In another embodiment, the formulation may contain a combination of additives that act as a foaming agent, with a sufficient amount of surfactant or soap to increase the foaming action of the formulation thereby dispersing the waste material over a greater surface area causing increased interaction with the formulation and its drying characteristics. In another embodiment, the formulation may comprise a combination of additives that act as a foam stabilizer, with a sufficient amount of light oils such as corn oil that retain the foam produced. Another example of foam stabilizers may be sugar, such as refined cane sugar or molasses. In another embodiment, the second component may comprise a combination of additives that act as an anti-freeze, with a sufficient amount of alcohol that prevents freezing of the second component in addition to speeding up drying of the waste material. In another embodiment, the formulation contains a combination of additives that act as a perfumer, with a sufficient amount of aromatic fragrances that cover potential, conspicuous odors released from the waste material.

In one embodiment, the second component comprises between 0.01 gram to 1.0 gram of copper sulfate ($CuSO_4$) per 50 milliliters of the second component. In another embodiment, the second component comprises between 0.1 grams to 0.5 grams of copper sulfate per 50 milliliters of second component. In a preferred embodiment, the second component comprises 0.2 grams of copper sulfate per 50 milliliters of second component. The copper sulfate may act as an anti-microbial agent.

In one embodiment, the first component comprises corn starch. Corn starch may act as a colorant. Corn starch may also increase the viscosity of the blended treatment formulation. The first component may comprise between 1 gram and 10 grams of corn starch in 50 ml of first component. In a preferred embodiment, the first component comprises between 1.5 grams to 5 grams of corn starch in 50 ml of first component. In a more preferred embodiment, the first component comprises 2.5 grams of corn starch in 50 ml of first component.

In one embodiment, the first component comprises a builder or tackifier, such as polymer clays, starches, resins, and polyacrylamides. Certain builders may also serve as an affordable colorant. The combination of builders in the dry component may range from ⅛ by volume of the first component. A list of soap fillers include starch, modified starch, gums, kaolinite clays, zeolite, bentonite, montmorillonite, illite, talc, resin (pitch), polyacrylamide, polyvinyl alcohol (PVA), and cellulose. In another embodiment, builders, fillers, tackifier agents comprise between 5% to 15% by volume of the first component. In a preferred embodiment, builders, fillers, tackifier agents comprise approximately ⅛ of the volume of the first component. An aliphatic resin such as polyacrylamide may be used for enhancement of waste material gelling. The first component may comprise polyacrylamide, in an amount between 5% to 50% by volume of the first component, which may help initiate gelling in the toilet bag.

In another embodiment, the first component comprises powdered graphite. The graphite may act as an anti-microbial and may inhibit the growth and attraction of insects. In one embodiment, the first component comprises between 0.01 gram to 1.0 grams of powdered graphite per 50 $cm^3$ of first component. In a preferred embodiment, the first component comprises between 0.1 grams to 0.8 grams of powdered graphite per 50 $cm^3$ of first component. In a more preferred embodiment, the first component comprises 0.4 grams of powdered graphite per 50 $cm^3$ of first component.

In one embodiment, a one-part formulation is a liquid formulation comprising a combination of soap and hydrogen peroxide. Use of the liquid-only embodiment would eliminate the need for a two-part formulation or a one-part formulation having separately phased components.

The formulation can be used to form a stable composition from a waste material. First, the formulation is activated by introducing the first component and the second component together in the waste material receiving bowl. Formulation activation may require an ambient temperature of at least 1° C. to prevent freezing of the second component. In the case of environments having sub-zero ambient temperature, the toilet may comprise a heating element. For example, a heating element can be incorporated into the shell of the waste material receiving bowl or an insert may be installed to position heat coils between the waste material receiving bowl and a disposable bag disposed therein. In order to facilitate activation of the formula, a heating element may be provided to maintain a temperature within or around the waste material receiving bowl of up to 50° C., between 15° C. to 35° C., or of at least 15° C.

The method for treating waste materials may comprise a pre-mixing step. During the pre-mixing step, an agitation device disposed within or around the waste material receiving bowl may be configured to agitate the formulation prior to receiving waste material. In embodiments having a first component and a second component, the pre-mixing step blends the two components. Alternatively, the pre-mixing step can be manually performed within a disposable bag, which is then inserted within the waste material receiving bowl. The pre-mixing step activates the formulation in preparation for reacting with the waste material.

Upon the deposition of a waste material into the reactive formulation, a continuing agitation mixes the formulation with the waste material. The reactive nature of the formulation may cause disintegration of the waste material. The formulation may coat and entomb the waste material. As the formulation is exposed to the atmosphere over time, the formulation cures and dries to form a stable waste material composition.

As shown in FIG. 1, the formulation can be delivered via a vessel. A vessel is a waste treatment package 10 having a first container 16 for the first component of the formulation and a second container 18. The first container 16 comprises a first distal end 12 and a first opening, at opposite longitudinal ends of the first container. The second container 18 comprises a second end 13 and a second opening, at opposite longitudinal ends of the second container. The first distal end 12 and second end 13 may be rounded or otherwise blunt so as to not puncture the disposable bag. A first lid 14 is sealed to the first container 16 and the second container 18 with a first seal 20. A first retaining member 22 provides structural support to join the first container 16 and a second container 18. A slot 24 is disposed between the first container 16 and the second container 18. The containers 16, 18 are shown as hollow cylinders approximately one inch in diameter to accommodate approximately 50 ml. In one embodiment, the first component is contained in the first container 16 and the second component is contained within the second container 18. The containers 16, 18 may be made of biodegradable or septic safe material such as cardboard, paper, natural products, and bioplastics. For the container to hold the second component, the interior surface of the container may be sprayed or coated with a waterproofing wax, plastic, or other similar substance.

The lid 14 is shown as being generally oval or circular-shaped. As illustrated, the lid 14 has a first lid portion that covers the first container 16 and a second lid portion that covers the second container 18. The lid has a diameter at least as great as the diameter of the opening on the dispensing end of the containers 16, 18. The lid 14 may also be made of a biodegradable material. A portion of the underside of the lid 14, such as the first lid portion or second lid portion, may be sprayed or coated with waterproofing to accommodate the presence of a liquid component.

The waste treatment package 10 is illustrated as comprising a first seal 20 between the container 16 and the lid 14. The seal 20 may comprise a sealant. The sealant may be a waterproof material such as wax used to seal the waterproof side of the lid 14 against the opening of the dispensing ends of the containers 16, 18 for securing and packaging the formulation. Sealing the waste treatment package preserves and maintains the first component separate from the second component.

The first retaining member 22 may be a band, strap, or sleeve. The first retaining member 22 may also be made of a biodegradable or septic safe material. The purpose of the fastener is to bind multiple containers together in the case of at least a two-part formulation. The first retaining member 22 is shown as supporting the first container 16 laterally adjacent to and laterally spaced apart from the second container 18, with the first container oriented parallel to the second container. Slot 24 is an opening, gap, or indention between the containers 16, 18 to receive an opener of the waste treatment package for prying or pulling off the lid 14 when the formulation is dispensed, as described below.

Figure 2:
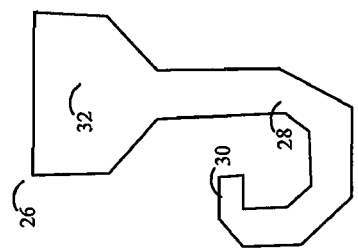
FIG. 2 shows a side view of a two-compartment waste treatment package opener for disbursement of the formulation.

A waste treatment package opener 26, as shown in FIG. 2, may be attached to a toilet for dispensing the multi-compartment waste treatment package into the waste material receiving bowl. The waste treatment package opener 26 comprises a hook elbow 28. The waste treatment package opener 26 comprises a pry arm 30 attached to a distal end of the hook elbow 28. A mount support 32 is attached to a proximal end of the hook elbow 28. The cross-section of the waste treatment package opener 26 may be generally cylindrical, oval-shaped, or rectangular. The waste treatment package opener 26 can be made of a material such as polyvinylchloride, metal, or other sturdy material. The hook elbow may be J-shaped or L-shaped to protract the pry arm 30 towards the user. The pry arm 30 comprises a knob, barb, clip, or catch for hooking the lid 14 of the waste treatment package 10. The mount support 32 may be shaped like a bolstered bracket or similar supporting structure. The mount support 32 can extend perpendicular to the hook elbow 28, parallel with the hook elbow 28, or at some other mount angle. The mount support 32 comprises at least one means for the permanent or temporary fastening of the mount support 32 to the toilet apparatus for accessibility and ease of use. Examples of fastening means include, gluing, taping, screwing, bolting, nailing, riveting, clasping, and coupling. In another aspect, the waste treatment package opener may be demountable for ease of cleaning or portability or replacement for maintenance purposes. The waste treatment package opener may be a straight or curved shaft that fits between the first container 16 and the second container 18.

In an alternative method for dispensing the formulation, the user closing the toilet seat causes the reactive formula to be dispensed into the waste material receiving bowl. The waste treatment package 10 can be prepositioned on the waste treatment package opener 26 with the toilet seat open. The waste treatment package 10 remains mounted to the waste treatment package opener 26 with the waste treatment package sealed as long as the toilet seat is in an open or semi-open position. Closing the seat causes the waste treatment package 10 to pivot relative to the waste treatment package opener 26. The lid 14 remains engaged with waste treatment package opener 26, such that the lid is pried off of the waste treatment package 10. Both the lid and the waste treatment package opener fall into the toilet.

The formulation can be easily dispensed into the waste material receiving bowl according to the method shown in FIG. 3. The user inserts the pry arm 30 in slot 24 of the waste treatment package, under the lid 14 and between the containers 16, 18, according to step 310. The operator removes the lid from the waste treatment package using an upward or downward pulling or prying force with the lid 14 against the opener, according to step 320. With the user continuing the follow through of the upward or downward pulling or prying force, the dispensing end of the waste treatment package begins to point downwardly toward the waste material receiving bowl according to step 330. Under the force of gravity, the formulation is dispensed into the toilet, according to step 340. The formulation dispenses into the toilet apparatus based on the position of the waste treatment package 10 in relation to the waste treatment package opener 26. For example, the formulation is dispensed into a disposable bag lining the waste material receiving bowl. Upon complete disbursement of the formulation into the toilet apparatus, the user discards the now empty septic safe waste treatment package into the waste material receiving bowl, according to step 350. The user is now ready to make a waste material deposit.

As shown in FIG. 4, a method according to the present disclosure for waste material treatment comprises the acts of installing a disposable bag in a waste material receiving bowl, such as a toilet apparatus, according to step 410. Examples of a toilet apparatus may be a non-contact agitating toilet, a bucket, or bowl-shaped trough. A disposable bag may be installed within the non-contact agitating toilet, bucket, or bowl-shaped trough. The disposable bag receives and retains the formulation and waste material. The toilet apparatus includes a waste material receiving bowl having a top member with an opening defining an annular seating surface, and an agitation device to agitate a formulation and the waste material disposed in the disposable bag. In one embodiment, the agitation device does not come into contact with the absorbent media or the waste material. In one embodiment, the step of activating the agitating device, according to step 422, precedes the step of dispensing the formulation, according to step 420. In another embodiment, the step of dispensing the formulation, according to step 430, precedes the step of activating the agitating device, according to step 432. Activating the agitating devices introduces a vibrational energy or other agitation within the waste material receiving bowl that is communicated through the disposable bag. Continued operation of the agitating device blends the multi-part formulation together, according to step 440. For example, once the dry material and the wet material are combined into the waste material receiving bowl, operation of the agitating device causes the soap and sodium percarbonate to dissolve into the water solvent. The resulting mixture has low friction, which enables efficient mixing of the waste with the waste treatment. Optionally, in a single-component formulation, the user may dispense the first component into the waste material receiving bowl according to step 422 or 430, and then refill the waste treatment package with water from a nearby faucet, and then dump the water into the waste material receiving bowl. The user then deposits waste material into the waste material receiving bowl, according to step 450. Agitation continues after the user deposits the waste material to entomb or cover the waste material within the disposable bag, according to step 460. Upon completion of the agitation cycle, the stabilized waste material may be disposed, according to step 470.

In the completing act, the agitating device is allowed to complete its agitation cycle on a timed run cycle to fully blend the components of the formulation within and over the deposited waste material. In one embodiment, the agitation cycle is at least 5 minutes, 10 minutes, or 20 minutes. In one embodiment, the agitation cycle is between 5 minutes and 60 minutes. In a preferred embodiment, the agitation cycle is between 15 minutes and 45 minutes. In a more preferred embodiment, the agitation cycle is completed in 30 minutes. If necessary, the agitation cycle may be interrupted and returned to. The toilet may comprise a pause button, allowing the agitation process to be stopped, with the remaining time left in the agitation cycle stored for subsequent continuation of the remaining time. Alternatively, a new cycle can be started regardless of previous agitation. In the optional disposing act, gelling or solidification of the waste material composition makes a generally solidified and stable mass which reducing the potential for spilling during transportation of the disposable bag containing the treated waste material.

The treated waste composition results from the combination and agitation of the treatment formulation and waste material. The treatment formulation reacts not only with the waste material (including feces and urine), but also reacts with other biodegradable materials, such as the waste treatment package and toilet tissue. The treated waste composition forms a stabilized viscous mass having properties that may be described as desirable—or at the very least as less undesirable than the untreated waste material. Some desirable properties being a composition that helps block the appearance of feces. Any feces is completely entombed in the treated waste material. This complete entombment also aides in reducing waste excrement odor. The treatment formulation may also react to deodorize the material—for example the soda ash and hydrogen peroxide may react with the odor causing chemicals in the waste material. Another desirable characteristic is that treated waste composition has a more stable, waxy texture that may not create harmful dust even when disturbed months later. The more stable treated waste composition created by the methods may be plasticized to a mass having a waxy gelatinized or otherwise solidified or viscous texture.

In a two-part formulation, the liquid solvent may include water as the activating agent for the sodium percarbonate and soap. In the means of deposition, the user deposits the waste material into the reactive formulation under the influence of vibrational energy or other agitation. As the waste material comes into contact with the reactive formulation, the oxidizing agent begins to release gas. The release of gas introduces foam into the agitating waste material and toilet tissue thereby emulsifying and dispersing the waste material and toilet tissue. A potential advantage to using the oxidizing agent such as sodium percarbonate is to increase the speed at which the waste material composition dries. Another potential advantage to the use of sodium percarbonate is the production of hydrogen peroxide which acts as an antiseptic when in contact with biological matter and soda ash which is a known deodorizer. As the waste material comes into contact with the reactive formulation, the soap is dissolved into the liquid solvent, which disperses and covers the waste material. An advantage to using a soap in the granular form the soap begins to liquify quickly when dissolved by an appropriate liquid solvent while in contact with the warm waste material. This agitation action and heat causes the mixture to become more viscous. In cooperation with the foaming action of the oxidizing agent, the thickened mixture disperses and traps the waste within the foam. As the reaction slows, the waste material composition stabilizes when the soap within the composition begins to solidify again. Gelling of the waste material occurs as the composition cools and loses moisture to absorption and evaporation. In the means of separation, moisture from the waste material composition and formulation is absorbed by the soap, waste material, discarded biodegradable waste treatment package materials and toilet tissue. Moisture from the composition evaporates quickly because of the composition's dispersion over a greater surface area providing more contact with air. An advantage to the present disclosure, is the means of formation of a mass with a waxy, solidified texture which limits the creation dust even when the composition is reagitated or disturbed after being abandoned and becoming fully dry. Another advantage to using an antibacterial soap and/or disinfecting cleaner as the first or second component of the formulation is the prevention of mold, bacterial growth, or other unwanted parasites within the stabilized waste material composition. Therefore, the stabilized mass can optionally be disposed of immediately, added to by another deposit of formulation and waste material, or indefinitely abandoned.

The formation of the novel composition is generally conducted at a temperature of at least 1° C. and at a temperature no greater than 50° C., and preferably at a temperature of at least 15° C. and in one embodiment, at a temperature of no more than 35° C. At temperatures less than 1° C., the water-based solvent used in the formulation can freeze; at temperatures higher than 50° C., sodium percarbonate can decompose. A temperature of at least 15° C. may increase the rate of reaction.

In one embodiment, the ratio of volume of soap to volume of sodium percarbonate is at least about 1:1 and no more than about 50:1. In another embodiment, the ratio of volume of soap to volume of sodium percarbonate is at least about 2.25:1 and no more than about 27:1. In another embodiment, the ratio of volume of soap to volume of sodium percarbonate is at least about 4:1 which equates to 40 ml of soap and 10 ml of sodium percarbonate for a 50 ml quantity of first component of the waste treatment formulation. In another embodiment, the ratio of volume of soap to volume of sodium percarbonate is no more than 13.5:1. In another embodiment, the ratio of volume of soap to volume of sodium percarbonate is 9:1, which equates to 45 ml of soap and 5 ml of sodium percarbonate for 50 ml of the first component of the waste formulation. The duration of reaction may last as long, or after, the agitation cycle on a timed run has ended.

In one embodiment, the ratio of volume of soap to volume of sodium carbonate is at least about 1:1 and no more than about 50:1. In another embodiment, the ratio of volume of soap to volume of sodium carbonate is at least about 2.25:1 and no more than about 27:1. In another embodiment, the ratio of volume of soap to volume of sodium carbonate is at least about 4:1 which equates to 40 ml of soap and 10 ml of sodium carbonate for a 50 ml quantity of first component of the waste treatment formulation. In another embodiment, the ratio of volume of soap to volume of sodium carbonate is no more than 13.5:1. In another embodiment, the ratio of volume of soap to volume of sodium carbonate is 9:1, which equates to 45 ml of soap and 5 ml of sodium carbonate for 50 ml of the first component of the waste formulation. The duration of reaction typically lasts as long, or after, the agitation cycle on a timed run has ended.

In one embodiment, the volume of the second component to be added to the first component is 1 part second component per 1 part first component. In another embodiment, the volume of the second component to be added to the first component is between 1 part second component to 4 parts second component for each 1 part first component. In another embodiment, the first container is a sealed flexible material that contains the second container, also a sealed flexible material. The first component is placed into the first container. The second component is isolated from the first component by being placed into the second container. In order to activate the mixing process, the second container is disrupted, such as by squeezing, to break the seal. The second component can be hand mixed with the first component, without breaking the seal of the first container. Upon sufficient mixing, the first container is opened, and the mixed contents are deposited in the waste material receiving bowl.

In one case, the dry component of the formulation for treatment of waste material may comprise an oil that is hydrogenated. Hydrogenation is a known process comprising a chemical reaction with hydrogen. The chemical reaction comprises an addition reaction in which hydrogen is added to the oil. Nickel may be a good catalyst for such reactions. Adding more catalyst may decrease the time to hydrogenate the oils. The oil may comprise a distiller's corn oil, a soybean oil, or a mixture thereof. Soap made from hydrogenated oil may reduce odors emanating from the waste material. In one example of hydrogenation, a parr shaker, also known as a parr hydrogenator, may be used to hydrogenate oils sealed in a reaction bottle with the catalyst and connected to a hydrogen reservoir. The air may be removed either by evacuating the bottle or by flushing the bottle with hydrogen. Pressure is then applied from the reservoir and the bottle is shaken vigorously to initiate the reaction. The bottle may be heated or cooled during the hydrogenation process. Heating the bottle will speed up the process of hardening the soybean oil into a waxy texture. After the reaction reaches the specified conditions, the shaker is stopped, the bottle vented, and the product and catalyst are recovered. In one example, the reaction progress for three hours in a parr shaker reactor having a cold bottle at ambient room temperature of 20 degrees Celsius (approximately 70 degrees Fahrenheit) with 140,000 pascals (approximately 20 pounds per square inch) of atmospheric hydrogen pressure to make a hardened soybean wax. A methanol reacted soybean wax may have a higher gelling capacity during waste stabilization than a heptane or hexane reacted soybean wax. The soap may be made from 65% hydrogenated soybean oil and 35% corn oil. The soap may be made from 40% to 90%, 50% to 80%, or 55 to 75% hydrogenated soybean oil. The soap may be made from 10% to 60%, 20% to 50%, or 25% to 45% corn oil.

In another example, the soap is made from hydrogenated soybean oil made by the following protocol. 100 milliliters (mL) of refined soybean oil is mixed with 50 mL of methanol. The hydrogenation takes place in the presence of a catalyst comprising 26 grams (approximately 400 grains) of a combination of nickel, platinum, and palladium and the oil is catalytically converted with a ceramic substrate. The soap having a waxy, stable texture may be chipped and ground into a granular or powdered form.

In one case, the dry component of the formulation for treatment of waste material may comprise a synthetic detergent soap. Synthetic Detergent (syndet) bars may be chipped and ground to prepare them for incorporation in the first component of the formulation. Examples of such synthetic detergent are disclosed in U.S. Pat. No. 3,376,229A filed on Dec. 11, 1964, PCT Application No. PCT/US1991/002201 filed on Apr. 25, 1990, U.S. Pat. No. 6,251,843 filed on Mar. 15, 1994, the disclosures of which are incorporated by reference herein. The synthetic detergent soap are commercially available, such as syndet bars from Zest™, Ivory™, Dove™, or other suppliers. Syndet bars having a waxy texture may be more easily granulized or powdered. In the example of Zest™, when used as a dry component in the first component, the lathering and gelatinizing effects mimicked the qualities of natural soap made from a hydrogenated oil and lye. Sodium based detergents, such as used in a dishwasher, clothes washer, or car wash may have better gelatinizing capabilities than laundry detergents.

In FIG. 5, another waste treatment package 10 is shown for dispensing a waste treatment. The waste treatment package may be made from a polytube, thermoplastic packaging material, coated aluminum foil, Kraft paper, cellophane, mylar, coated polypropylene, or any flexible packaging material conducive to making a burstable zone or seal. The waste treatment package may be made of biodegradable or dissolvable plastic. The waste treatment package made from polytube may be made from polyvinyl alcohol, polyethylene plastic, polyvinyl acetate, cellulose ethers, gum acacia, starch, dextrin, or any other appropriate water-soluble polymer. The waste treatment package may range in thickness from 0.5 millimeters (mm) to 3 mm or may comprise any appropriate thickness that is flexible and maintains functionality. The waste treatment package has a first compartment 16 for the first component of the formulation and a second compartment 18 for the second component of the formulation. In one example, the waste treatment package may be used as a single-use waste treatment formulation and package. In another case, the waste treatment package may be reusable. The waste treatment package has a first distal end 12 where the first and second components are expelled from the compartments when appropriate pressure is applied to the waste treatment package. The appropriate pressure applied to the waste treatment package causes closed burstable zones of the waste treatment package to burst open. At the first distal end 12 is a burstable zone. At the second end 13 is a sealed zone or a zone that is less-burstable. The less-burstable zone is less burstable than the burstable zone thereby giving a directional bias to the expulsion of components of the formulation when the waste treatment package is pressurized. Building pressure causes the components of the formulation to seek the path of least resistance. The burstable zone is more easily unsealed than the less-burstable zone thereby forming a preferential flow of the components of the formulation from the waste treatment package when burst.

The burstable zone may be formed by a heat sealer, heat bar, ultrasonic sealer, vacuum sealer, impulse sealer, or similar device. A heat sealer may be used in forming the burstable zones with a heat crimped seal. The heat crimped seal may be formed by a 12-inch table-top direct heat sealer. The heat sealer may be equipped with a temperature dial to control the sealing temperature and an electronic timer to control the sealing time. When the correct settings have been established, seals may be formed repeatedly with the set heat, time and pressure. The sealers may have hot sealing bars with different jaw designs such as meshed, serrated, or straight lined. The waste treatment package material is inserted in between the hot sealing bars then pressed together and released. The heat sealer may have a foot switch provided for forming multiple waste treatment packages with crimped heat seals. The pressure for crimping the flexible polytube sleeve at a burstable zone may be between 50 and 150 Newtons of force (approximately 10 to 30 pounds of force). The heat crimped seal for a burstable zone may be formed by applying 90- to 100-degrees Celsius (C) (approximately 195 to 215 degrees Fahrenheit) of heat to the polytube for a time between 0.2 and 0.5 seconds. The pressure for crimping the flexible polytube sleeve at a less-burstable zone may be between 50 and 150 Newtons of force (approximately 10 to 30 pounds of force). The heat crimped seal for a less-burstable zone may be formed by applying 110- to 120-degrees C. (approximately 230 to 250 degrees Fahrenheit) of heat to the polytube for a time from 0.25 to greater than 0.5 seconds. The less-burstable zone may be formed by forming multiple heat crimped seals within the less-burstable zone 20. An aperture 29 may be disposed through the waste treatment package 10 within the less-burstable zone 20 near the second end 13. The aperture may allow the waste treatment package to be hung on a peg or any similar device at a precise location.

A first compartment 16 is made within the waste treatment package 10 by forming a first burstable zone 25 at the first distal end 12 and a less-burstable zone 20 at the second end 13. A second burstable zone 23 is disposed between the less-burstable zone and the first burstable zone. The first component in the first compartment 16 may be separated from the second component in the second compartment 18. In this configuration, the second compartment 18 is disposed between the second burstable zone 23 and the less-burstable zone 20 and the first compartment 16 is disposed between the first burstable zone 25 and the second burstable zone 23. Filling the volume of the first compartment 16 with a corresponding volume of the first component of the formulation may leave little to no dead space. The second compartment 18 may be filled in the same manner.

Alternatively, the first compartment may be positioned horizontally aside the second compartment having a generally T-shaped binding portion disposed between the compartments along a longitudinal and a perpendicular axis of the flexible sleeve. The perpendicular axis may be towards the second end 13 of the flexible sleeve. The two compartments would share the first burstable zone 25. The first compartment within the waste treatment package may be delimited by the first burstable zone 25 and the generally T-shaped binding portion. The second compartment adjacent to the first compartment may also be delimited by the first burstable zone 25 and the generally T-shaped binding portion.

In FIG. 6, another waste treatment package 10 is shown for dispensing a waste treatment. The waste treatment package may be made from dual polytube or sleeves. A first compartment 16 is disposed between a first burstable zone 25 and a second end 13 of the first polytube. A second compartment 18 is disposed between the second burstable zone 23 and a less-burstable zone 20 of the second polytube. The second polytube may be disposed within the first polytube to form a waste treatment package.

A method 700 for dispensing a waste material treatment is shown in the flowchart of FIG. 7. A first component in a first compartment of a waste treatment package secured by a first burstable seal is provided, according to step 702. A second component is provided in a second compartment of the waste treatment package and secured by a second burstable seal, according to step 704. The volume of the first component may correspond to the volume of the first compartment, and the volume of the second component may correspond to the volume of the second compartment, according to step 706. The second component, a fluid, may be arranged upstream of the first component, a dry component, according to step 708. When applying pressure to the waste treatment package, the first burstable seal and the second burstable seal break whereby the first component and the second component are expelled, such as into a non-contact toilet, according to step 710. The pressure may be applied perpendicular to a direction of flow of the first component and the second component, according to step 712. The pressure to the waste treatment package may be applied by the hand of the user, by mechanical assist, a pinching mechanism, or any other device able to pressurize the waste treatment package. The first compartment and the second compartment are pressurized with the application of the pressure, according to step 714. The second component enters the first compartment upon breaking the second burstable seal, according to step 716. Pressure within the second compartment is transferred to the first compartment upon the second component entering the first compartment, according to step 718. The first component, a dry component, is flushed out of the vessel with the second component, a fluid, according to step 720. Mixing of the first component and the second component occurs in the waste treatment package and during the descending flight of the components, to the floor of the toilet receptacle. Further mixing and agitation may occur within the toilet, according to step 722. Additionally, the user may drop the emptied waste treatment package into the toilet receptacle to aid in the comingling of waste treatment and waste by providing a slippery surface between the waste treatment, waste treatment package, and the waste.

Figure 8:
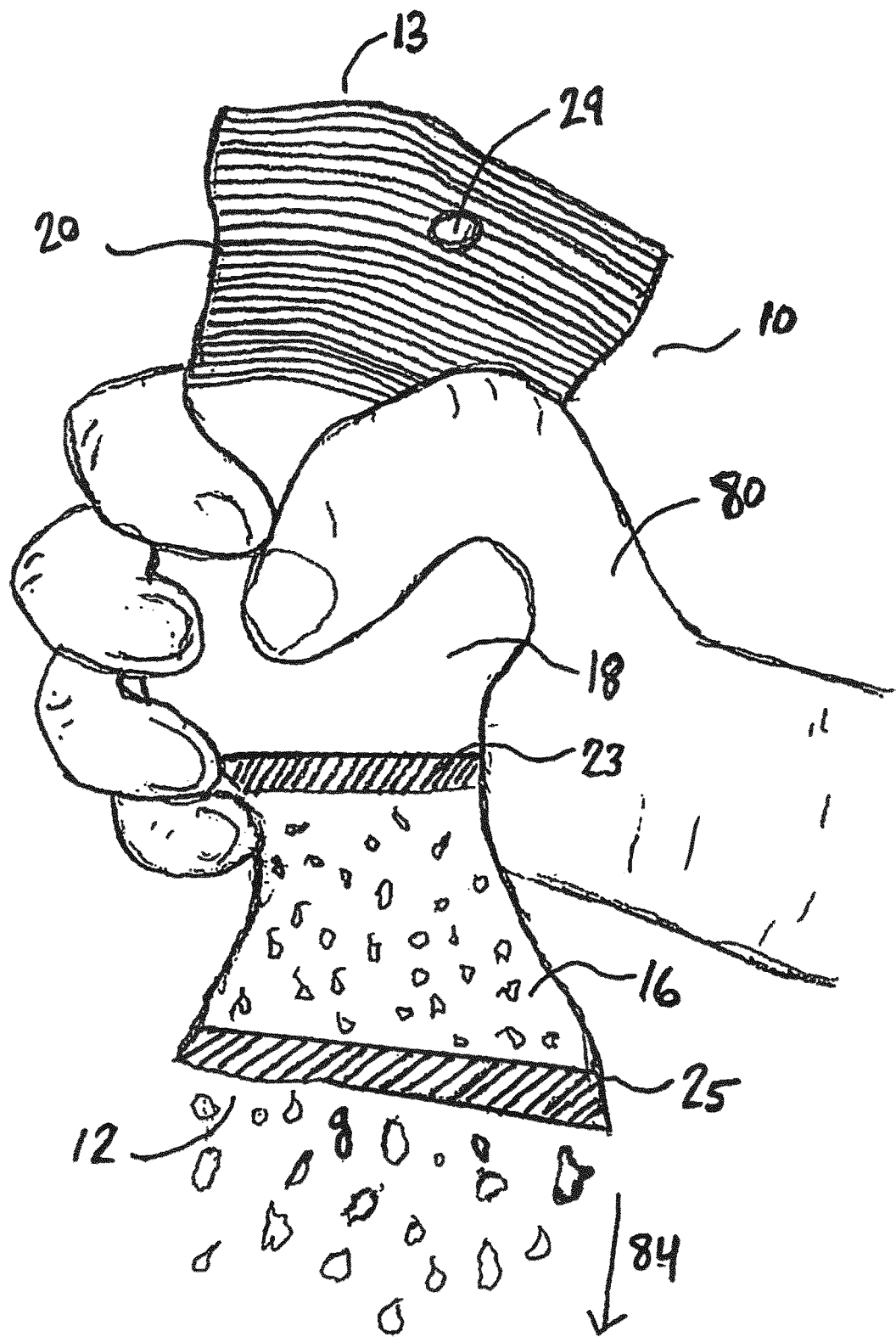
FIG. 8 shows a front view of a hand applying pressure to jointly expel the separated contents of a multi-compartment waste treatment package.
Figure 9:
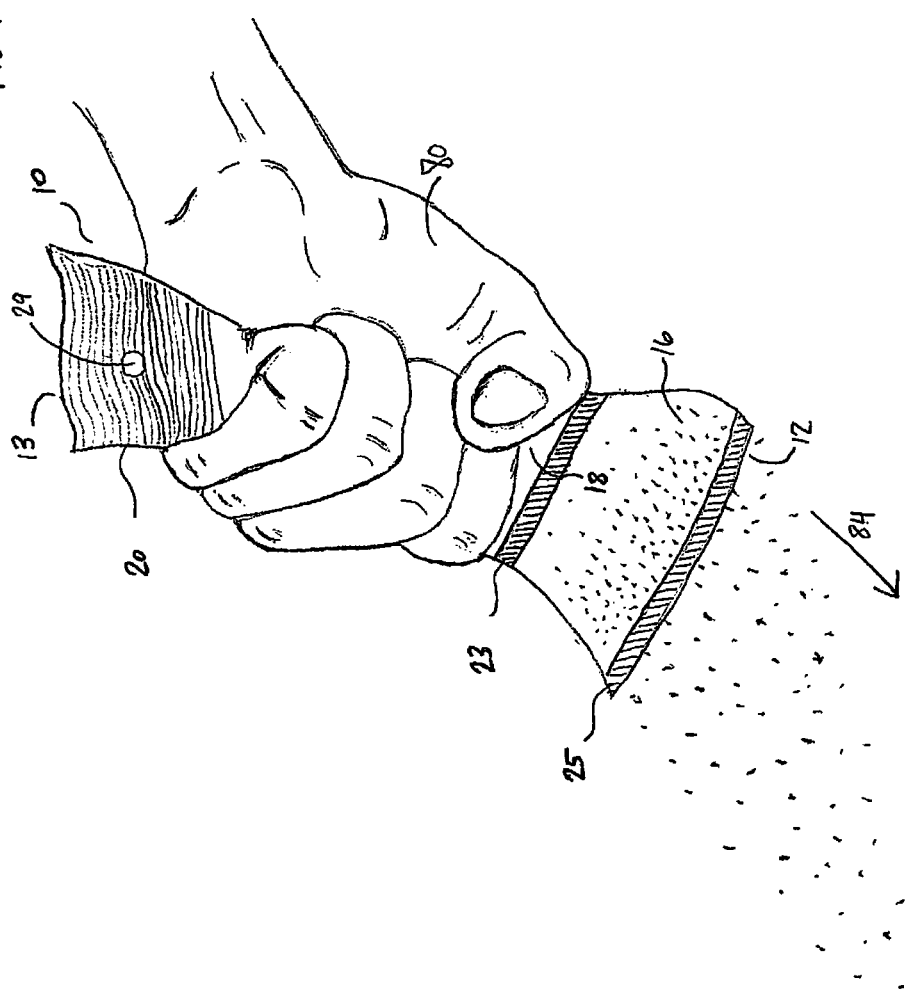
FIG. 9 shows a front view of a different hand grip applying pressure to jointly expel the separated contents of a multi-compartment waste treatment package.

In FIGS. 8 and 9, expulsion of the components from the waste treatment package may be completed with pressure applied by a hand 80 of the user. The waste treatment package 10 of the present disclosure is constructed from polytube having dimensions that fit an average adult-sized hand. The dimension of the waste treatment package shown are approximately 65 millimeters (2.5 inches) wide, 130 mm (five inches) long, and 20 mm (0.75 inches) thick. The waste treatment package may be constructed from polytube having dimensions that fit a smaller or larger adult-sized hand. The pressure may be applied by the gripping action of the hand 80 perpendicular to a direction of flow of the first component and the second component as shown by directional arrow 84. Application of pressure to the second compartment 18 pressurizes the first compartment 16 by inducing pressure within the second compartment. Pressure may be further induced by having filled the volume of the first compartment with a corresponding volume of the first component of the formulation and filling the volume of the second compartment with a corresponding volume of the second component of the formulation. In so doing, little or no dead space is left giving immediate pressurization of the waste treatment package 10 when pressure is applied. When adequate pressure is applied, the second seal may break, allowing the second component to enter the first compartment. The second component of the formulation entering the first compartment may transfer pressure to the first compartment causing the first seal to break. Alternatively, pressure applied to the waste treatment package 10 may pressurize both compartments and break the seals simultaneously. FIGS. 8 and 9, show different ways to grip the waste treatment package in hand based on user preference. In FIG. 8, the user is holding the waste treatment package with the user's thumb in an upward oriented position opposite in direction to the flow of the components out of the waste treatment package as shown by directional arrow 84. In FIG. 9, the user is holding the waste treatment package with the user's thumb in a downward oriented position facing the direction of component flow out of the waste treatment package as shown by directional arrow 84.

Figure 10:
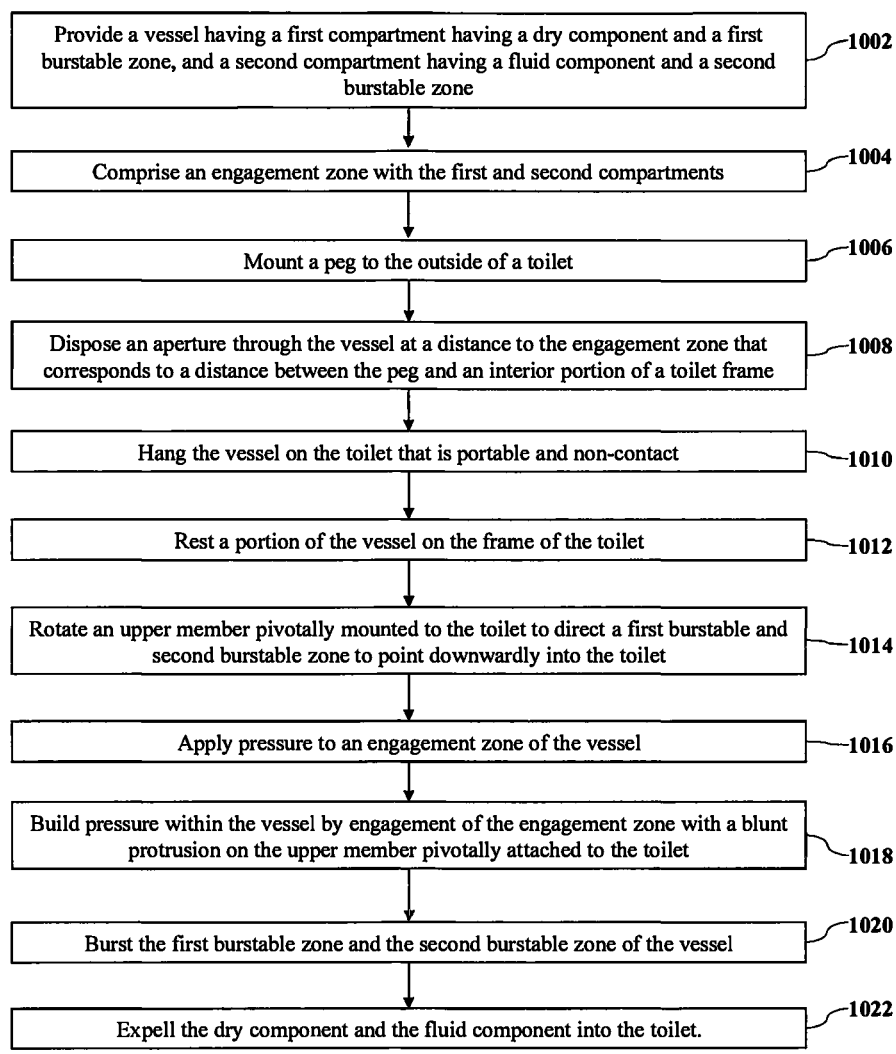
FIG. 10 shows a flowchart for bursting the burstable seals of a waste treatment package with a toilet lid.

A method 1000 for dispensing a waste material treatment with a toilet lid is shown in the flowchart of FIG. 10. A waste treatment package having a first compartment having a dry component and a first burstable zone, and a second compartment having a fluid component and a second burstable zone is provided, according to step 1002. The first compartment having the volume of the dry component may correspond to the volume of the first compartment. The second compartment having a volume of the fluid component may correspond to the volume of the second compartment. An engagement zone may comprise the first compartment and the second compartment, according to step 1004. A peg may be mounted to the outside of the toilet for mounting a waste treatment package, according to step 1006. An aperture may be disposed through the waste treatment package at a distance to the engagement zone that corresponds to a distance between the peg and an interior portion of a frame of the toilet, according to step 1008. The waste treatment package is hung on a receptacle such as a toilet that may be portable and non-contacting, according to step 1010. A portion of the waste treatment package is rested on a frame of the toilet, according to step 1012. An upper member, such as a lid, pivotally attached to the toilet may be rotated down towards the toilet to engage the engagement zone of the waste treatment package. The upper member may direct a first burstable zone and a second burstable zone to point downwardly into the toilet, according to step 1014. Pressure is applied to the engagement zone of the waste treatment package by the upper member, according to step 1016. Pressure builds within the waste treatment package as the engagement zone is engaged by a blunt protrusion on the upper member, according to step 1018. The first burstable zone and second burstable zone of the waste treatment package are burst, according to step 1020. The dry component and the fluid component are expelled into the toilet, according to step 1022.

Figure 11:
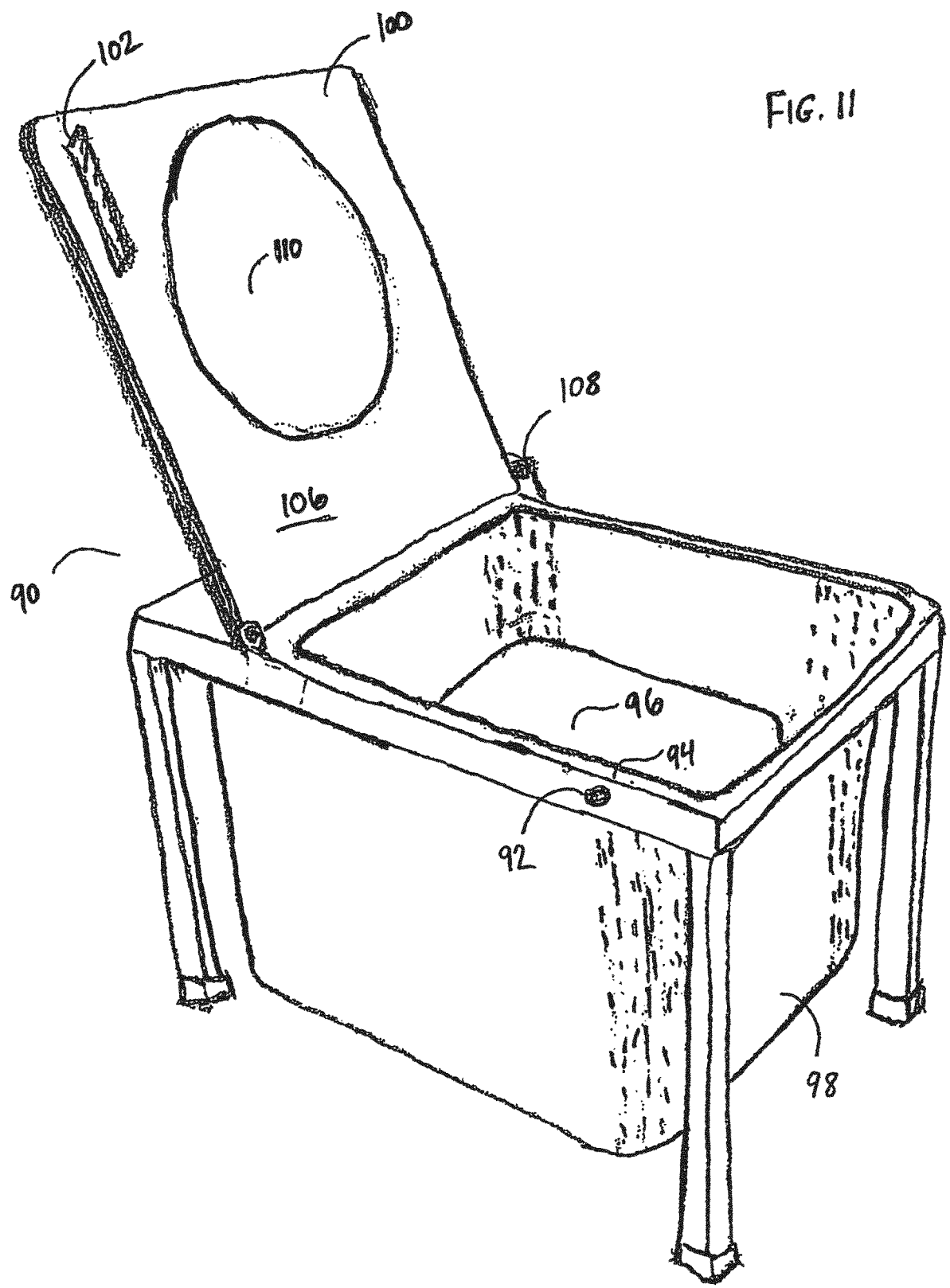
FIG. 11 shows side-front perspective view of a toilet with a lid in an open position ready to receive a waste treatment package.

As shown in FIG. 11, a toilet as previously referenced may be provided for use with the method as described in FIG. 10. The toilet 90 may have a peg 92. The peg may be a screw, bolt, hook, or other means to fasten the waste treatment package to the toilet. The peg is secured to the frame 94 of the toilet. The toilet may have a lid 100 that may or may not act a seat for the user. The toilet lid may have a blunt protrusion 102 for applying pressure at an engagement zone 11 of the waste treatment package 10 (discussed further below). The lid may be hinged to the toilet by a pivot point 108.

Figure 12:
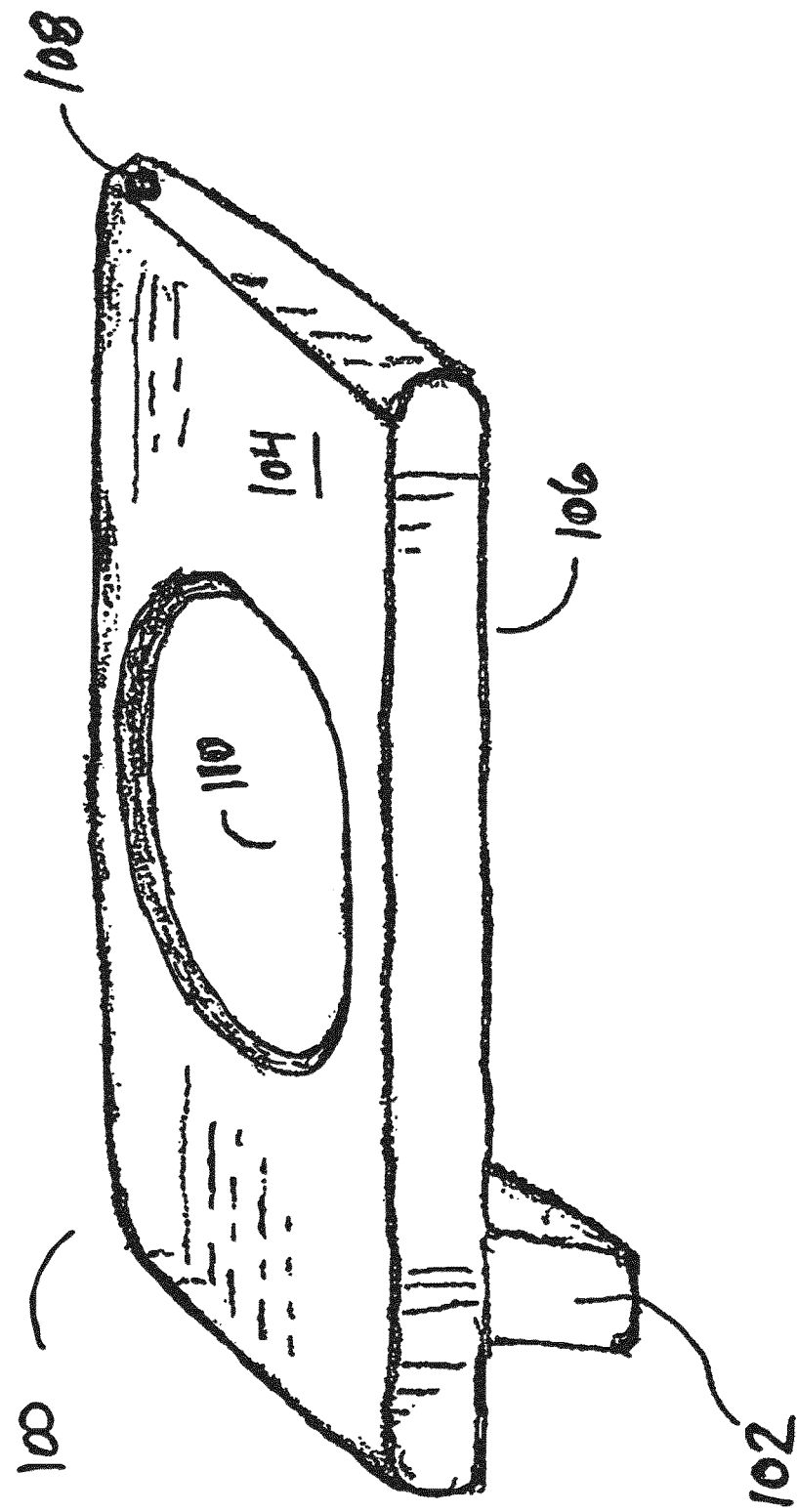
FIG. 12 shows a frontside perspective view of the lid of the toilet having a blunt protrusion for expelling the separated contents of a multi-compartment waste treatment package.

In FIG. 12, a toilet lid 100 is shown separate from the toilet. The toilet lid may be circular, square, oval, rectangle, or any other convenient shape. The toilet lid may be flat or have a surface contoured to correspond to the toilet below and the user above. The toilet lid may have rounded, smooth, or cornered edges. The toilet lid may have a toilet lid aperture 110 for the user to deposit waste through when the lid is in a closed position. The aperture may be rounded or oval. The blunt protrusion 102 is located on an underneath side of the toilet lid when the toilet lid is in relation to a closed position on the toilet. The blunt protrusion 102 may be located on a left-hand or right-hand side of the bottom portion 106 of the toilet lid. The blunt protrusion may be rectangular, angled or curved in shape. The blunt protrusion may be a structure located on the bottom portion 106 of the toilet lid that forms a perimeter outside and around the toilet lid aperture 110 for engaging multiple waste treatment packages (not shown) placed in the rest position as described in FIG. 10 and shown in FIG. 14.

Figure 13:
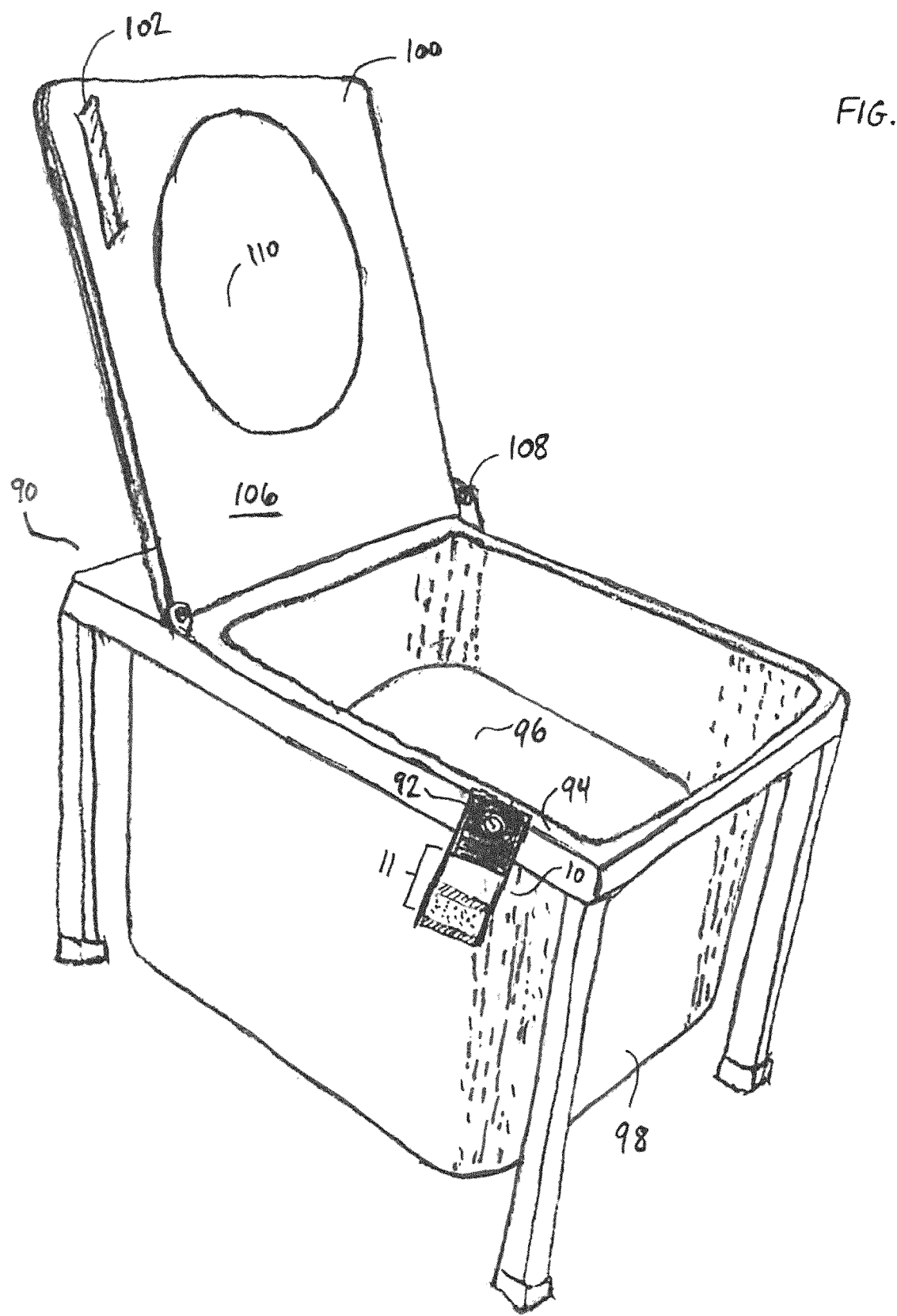
FIG. 13 shows a side-front perspective view of a multi-compartment waste treatment package hanging on a peg of the toilet.

As shown in FIG. 13, the waste treatment package may be hung on a peg 92 mounted to the outside of the toilet 90 for storage. Alternatively, multiple waste treatment packages (not shown) may be hung on multiple pegs mounted to the outside of the toilet 90. An advantage of storing the waste treatment package on the toilet is ease of access and prevention of a user having to retrieve a waste treatment package when in dire need of the services of the toilet.

Figure 14:
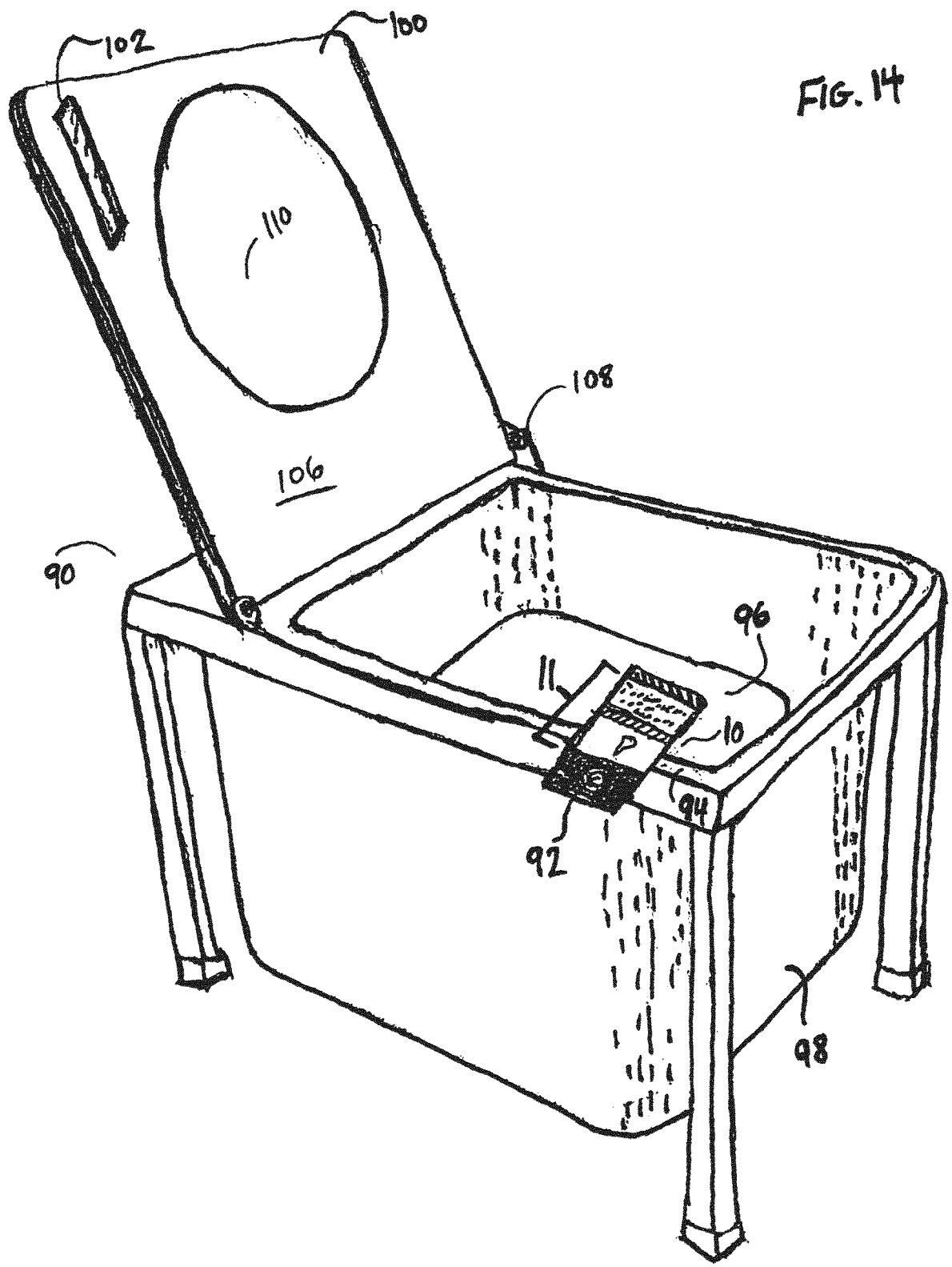
FIG. 14 shows a side-front perspective view of a multi-compartment waste treatment package resting on a frame of the toilet.

As shown in FIG. 14 and discussed in FIG. 10, the waste treatment package 10 rests upon a frame 94 of the toilet 90. The engagement zone 11 of the waste treatment package having at least a portion of the first compartment and a portion of the second compartment is configured to align with the blunt protrusion 102 of the toilet lid 100. This alignment occurs based on the location of the aperture 29 disposed through the waste treatment package 10 in relation to a distance to the engagement zone 11 corresponding to a distance between the peg 92 mounted to the outside of the toilet 90 and an interior portion of the frame 94.

Figure 15:
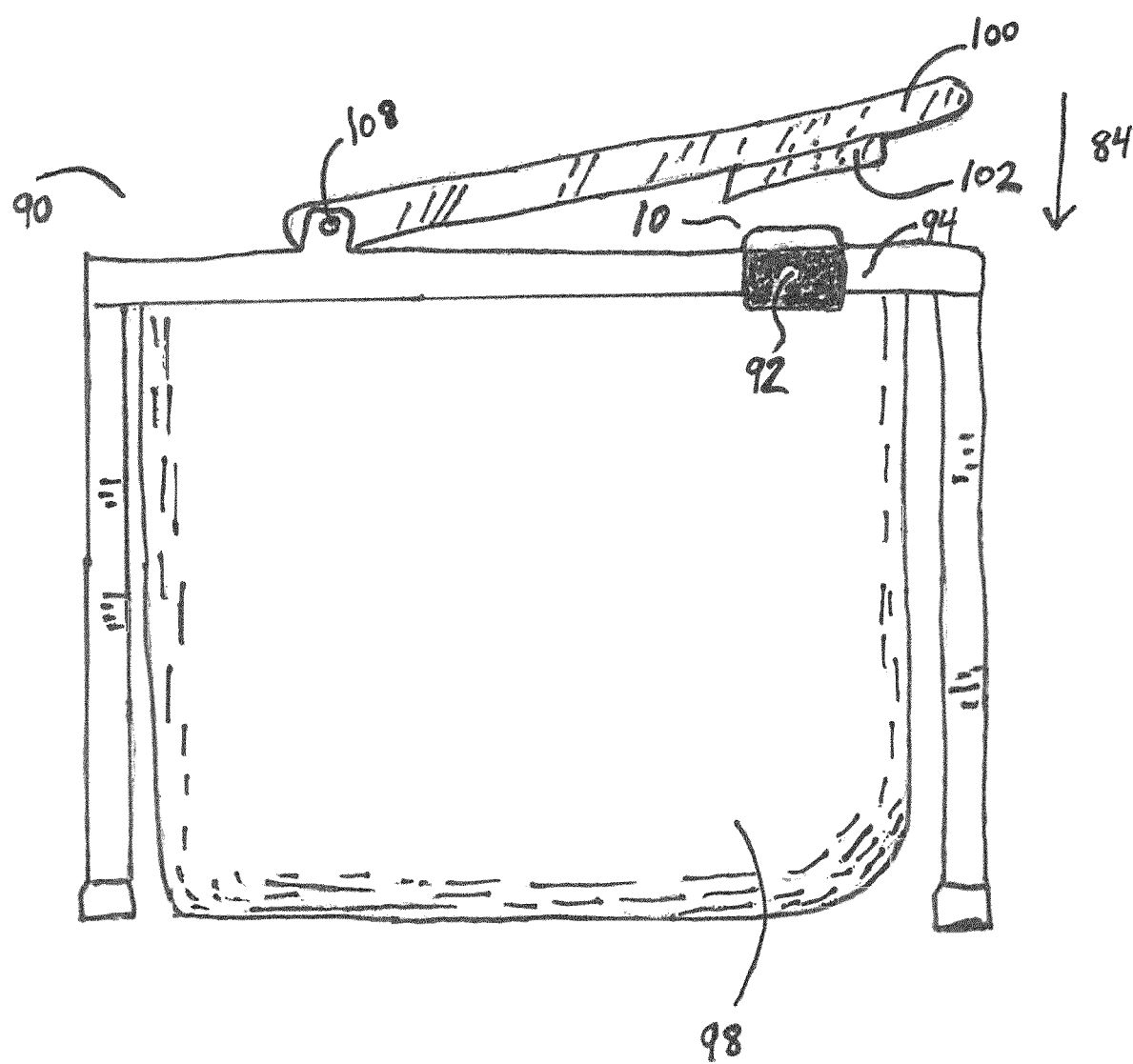
FIG. 15 shows a side perspective view of the toilet with the blunt protrusion of the toilet lid in a downward movement to engage a multi-compartment waste treatment package.

FIG. 15 shows a side view of the toilet 90 and the waste treatment package 10 in a resting position on the frame 94 of the toilet. The toilet lid pivotally hinged and mounted to the toilet is in a descending movement as shown by directional arrow 84. The blunt protrusion 102 will encounter the engagement zone 11 of the waste treatment package 10 resting on the frame 94 of the toilet 90. The aperture 29 of the waste treatment package is positioned over the peg 92 of the toilet. The aperture 29 disposed through the less-burstable zone 20 is placed in a location of the waste treatment package to properly position the engagement zone 11 of the waste treatment package on the frame 94. The aperture 29 disposed through the waste treatment package is at a distance to the engagement zone corresponding to a distance between the peg 92 mounted to the outside of the toilet 90 and an interior portion of the frame 94.

Figure 16:
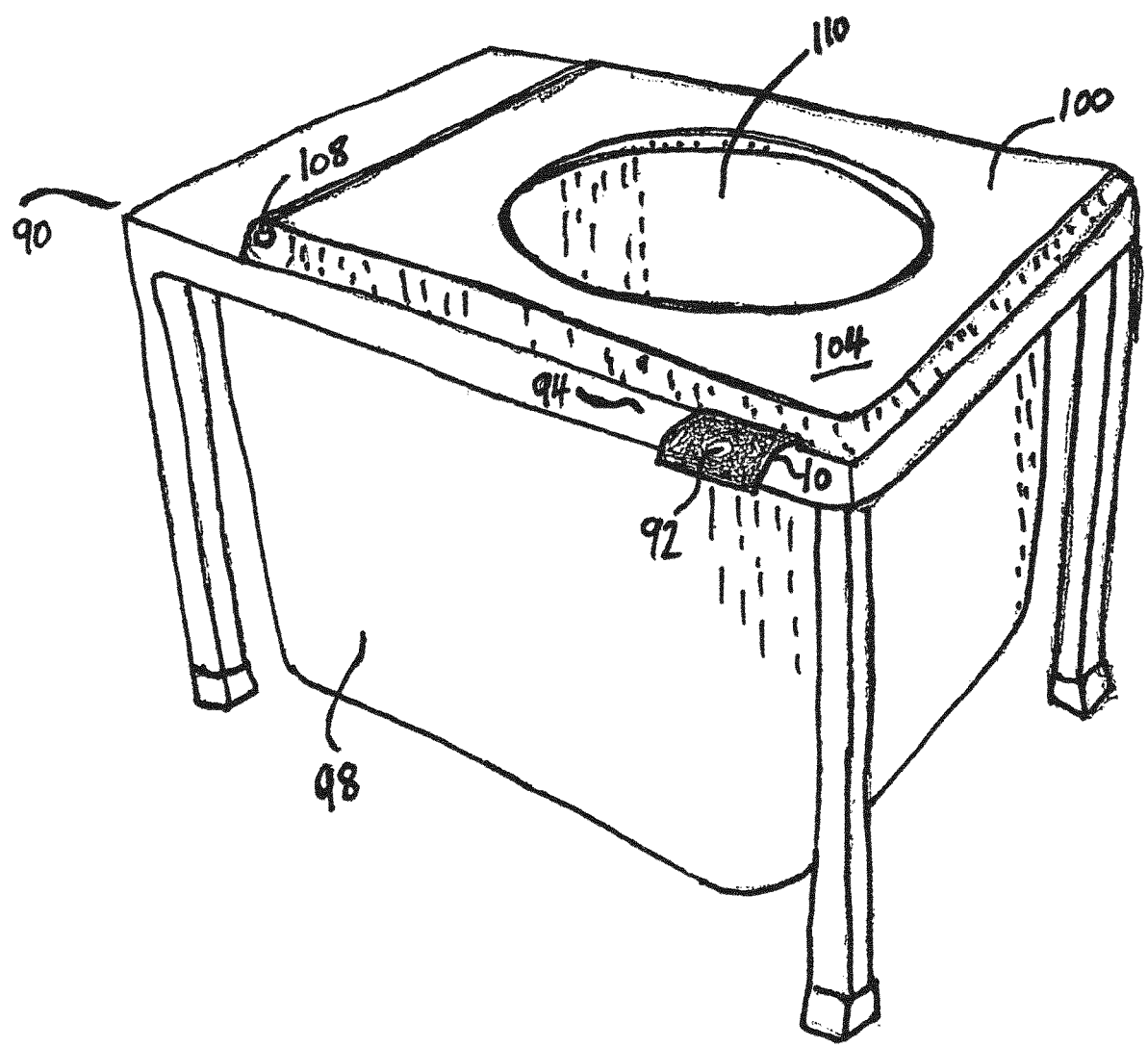
FIG. 16 shows a side-front perspective view of the toilet with the lid in a closed position.
Figure 17:
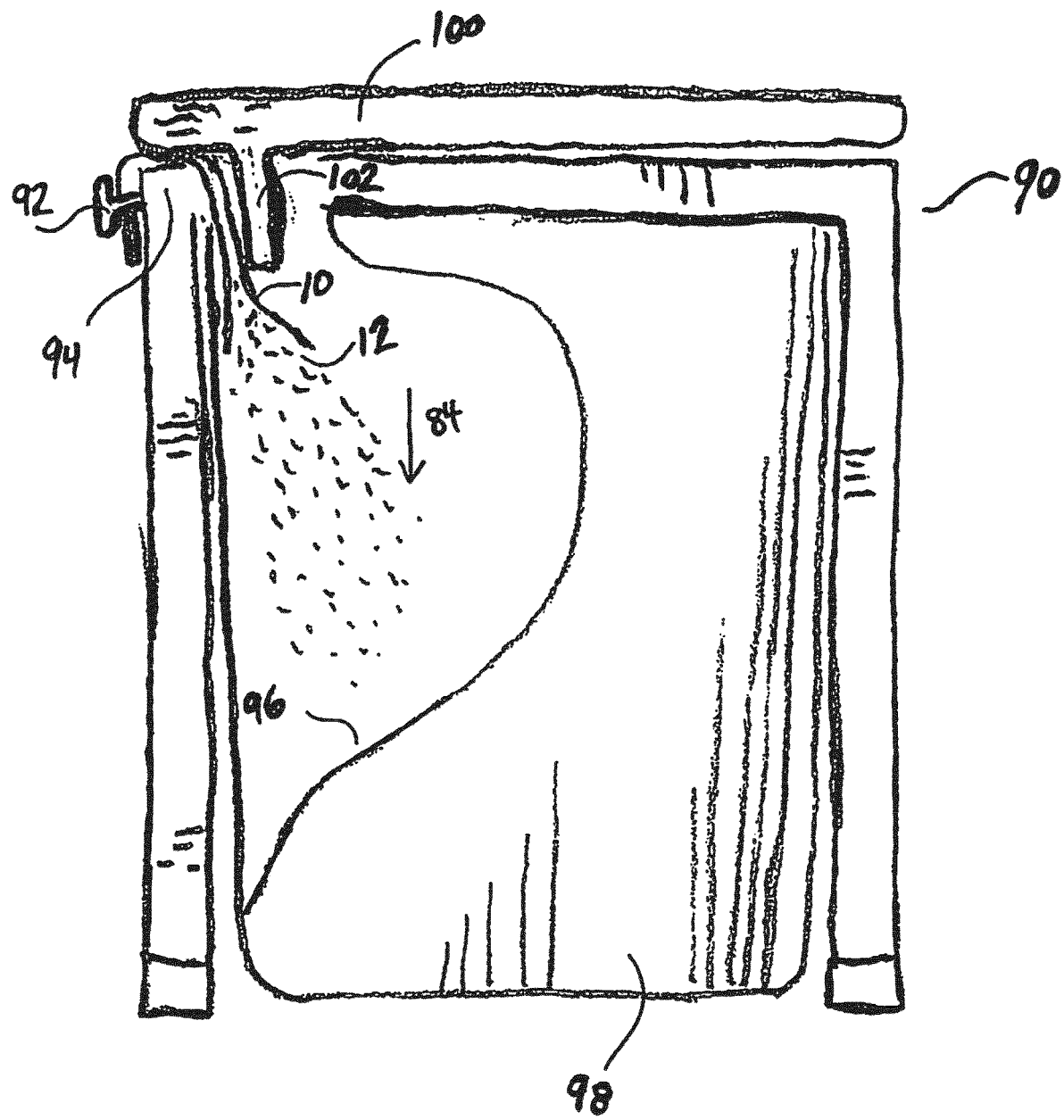
FIG. 17 shows a side perspective view of the toilet partially revealing the interior as the contents of the waste treatment package are being expelled.

FIG. 16 shows the toilet lid 100 in a closed position. The toilet lid may be closed by hand of the user with a pushing force to supply the pressure to burst the waste treatment package. Alternatively, the upper portion 104 of the lid may be sat upon by the user to supply the pressure to burst the waste treatment package. The waste treatment package 10 becomes pinched between the interior portion of the frame 94, the blunt protrusion 102, and a bottom portion 106 of the lid. Little to no space exists between these structures thereby causing the components of the formulation to be expelled into the receptacle of the toilet 98 as shown in FIG. 17. The empty waste treatment package may remain mounted to the peg 92. The user may choose to deposit the empty waste treatment package into the toilet before, during, or after a waste deposit. The blunt protrusion 102 may be arranged in position or shape to tear the waste treatment package from the peg after the formulation has been expelled. This allows for the waste treatment package to fall into the toilet automatically.

FIG. 17 is a frontal cross-section of the inside of the toilet 90 with the lid of the toilet in a closed position as previously shown in FIG. 16. After closing the lid onto the rotated waste treatment package placed in the resting position, the blunt protrusion 102 engages the waste treatment package at the engagement zone 11. The blunt protrusion 102 encourages the first burstable zone and the second burstable zone to point downwardly into the toilet. The user applies pressure through the lid and to the waste treatment package through the blunt protrusion. Applying pressure builds pressure within the waste treatment package in a downward direction when engaged by the blunt protrusion 102. Application of pressure to the second compartment 18 by the blunt protrusion 102 causes simultaneous pressurization of the first compartment 16 and the second compartment 18. Applying pressure to the waste treatment package breaks the first burstable seal and the second burstable seal simultaneously whereby the first component and the second component of the formulation are expelled into the non-contact toilet in a downward direction as shown by directional arrow 84. Alternatively, the second seal may break first allowing the second component of the formulation to enter and pressurize the first compartment. When the second component enters the first compartment and applies pressure on the first compartment the first burstable zone 25 will break. With arrangement of the second component, a fluid, upstream of the first component, a dry component, the fluid washes the dry component out of the first compartment 16. Mixing of the fluid and dry component may occur within the burstable sealed waste treatment package or pouch when the user applies sufficient force to burst the second compartment, then the first compartment. Mixing of the fluid and dry component may also occur as the two components are in flight downward towards a floor of the receptacle 96. Further mixing of the first component and the second component may also occur with rotary action within the non-contact toilet.

Although the present invention has been described in considerable detail with reference to certain preferred versions thereof, other versions are possible. Therefore, the spirit and scope of the appended claims should not be limited to the description of the preferred version contained herein.

In the Summary of the disclosure above and in the Description of the disclosure, and the Claims below, and in the accompanying Drawings, reference is made to particular features (including method steps) of the present disclosure. It is to be understood that the present disclosure in this specification includes all possible combinations of such particular features. For example, where a particular feature is disclosed in the context of a particular aspect or embodiment of the present disclosure, or a particular claim, that feature can also be used, to the extent possible, in combination with and/or in the context of other particular aspects and embodiment of the present disclosure, and in the present disclosure generally.

It is understood that the other embodiments will become readily apparent to those skilled in the art from the following detailed description, wherein various embodiments are shown and described by of illustration only. As will be realized, the concepts are capable of other and different embodiments and their several details are capable of modification in various other respects, all without departing from the spirit and scope of what is claimed in the present disclosure. Accordingly, the drawings and detailed description are to be regarded as illustrative in nature and not as restrictive.

The term "comprises" and grammatical equivalents thereof are used herein to mean that other components, ingredients, steps, etc. are optionally present. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25% to 100% means a range whose lower limit is 25%, and whose upper limit is 100%.

I claim:

1. A waste treatment packaged formulation comprising:
   a. a waste treatment package that is dissolvable;
   b. a waste treatment formulation disposed within the waste treatment package,
      wherein the waste treatment formulation is reactive in the presence of a liquid solvent to form a stable solid after reacting with a waste material within a non-contact agitating toilet and comprises:
      i. a foamable surfactant that is granular;
      ii. a sodium percarbonate; and
      wherein a ratio of the foamable surfactant to the sodium percarbonate is between 2.25:1 to 50:1.

2. The waste treatment packaged formulation of claim 1, wherein the waste treatment package comprises a material selected from a list of cardboard, paper, and bioplastics.

3. The waste treatment packaged formulation of claim 1, wherein the waste treatment package comprises polyvinyl alcohol, polyvinyl acetate, cellulose ethers, gum acacia, starch, dextrin, or bioplastics.

4. The waste treatment packaged formulation of claim 1, wherein the ratio of the foamable surfactant to the sodium percarbonate is between 2.25:1 to 27:1.

5. The waste treatment packaged formulation of claim 1, wherein the foamable surfactant is a syndet.

6. The waste treatment packaged formulation of claim 1, wherein the foamable surfactant is a soap.

7. The waste treatment packaged formulation of claim 6, wherein the soap comprises at least one of a soap from hydrogenated soybean oil, a soap from corn oil, and a combination thereof.

8. The waste treatment packaged formulation of claim 6, wherein the soap is between 10 grams and 35 grams.

9. The waste treatment packaged formulation of claim 6, wherein the waste treatment package comprises:
   a. a first compartment containing the foamable surfactant; and
   b. a second compartment containing the sodium percarbonate.

10. The waste treatment packaged formulation of claim 1, wherein a volume of the waste treatment package holds approximately 50 cubic centimeters of space.

11. The waste treatment packaged formulation of claim 10, wherein the foamable surfactant comprises at least 35% of the volume of the waste treatment formulation and the sodium percarbonate comprises at least 2.25% of the volume of the waste treatment formulation.

12. The waste treatment packaged formulation of claim 10, wherein the foamable surfactant is between 40% to 97.75% by volume of the waste treatment formulation.

13. The waste treatment packaged formulation of claim 10, wherein the foamable surfactant is between 45% to 97.75% by volume of the waste treatment formulation.

14. The waste treatment packaged formulation of claim 10, wherein the foamable surfactant comprises at least 45% of a first volume of the waste treatment formulation.

15. The waste treatment packaged formulation of claim 1, wherein the sodium percarbonate comprises between 10% to 20% of a total volume of the waste treatment formulation.

16. The waste treatment packaged formulation of claim 1, wherein the ratio of the foamable surfactant to the sodium percarbonate is between 2.25:1 to 9:1.

17. The waste treatment packaged formulation of claim 1, wherein the sodium percarbonate is between 5 grams and 10 grams.

18. The waste treatment packaged formulation of claim 1 further comprising:
   a. a disinfectant.

19. The waste treatment packaged formulation of claim 1 further comprising:
   a. between 0.01 grams to 1.0 grams of powdered graphite.

20. The waste treatment packaged formulation of claim 1 further comprising:
   a. between 4 grams and 10 grams of corn starch.

21. The waste treatment packaged formulation of claim 1 further comprising:
   a. between 0.1 grams to 0.5 grams of copper sulfate.

22. The waste treatment packaged formulation of claim 1 further comprising:
   a. between 0.01 grams to 1.0 grams of powdered graphite; and
   b. between 0.1 grams to 0.5 grams of copper sulfate.

23. A method of treating waste material in a non-contact agitating toilet comprising the steps of:
   a. providing a waste treatment packaged formulation according to claim 1;
   b. inserting the waste treatment packaged formulation into the non-contact agitating toilet;
   c. activating the non-contact agitating toilet;
   d. depositing a waste material into the non-contact agitating toilet;
   e. reacting the waste treatment packaged formulation with the waste material within the non-contact agitating toilet to form a stable solid treated waste product.

24. The method of claim 23, wherein the waste material comprises at least one of urine, feces, and a combination thereof.

25. The method of claim 24, wherein the step of reacting, a gas releases with a foaming and dispersing action.

26. The method of claim 23, wherein the foamable surfactant is at least 35% by volume of the waste treatment formulation and the sodium percarbonate is at least 2.25% by volume of the waste treatment formulation.

27. The method of claim 23, further comprising the steps of:
   a. providing a liquid solvent; and
   b. combining the liquid solvent with the waste treatment formulation within the non-contact agitating toilet.

28. The method of claim 27, wherein the liquid solvent is water based.

* * * * *